(12) United States Patent
Quan et al.

(10) Patent No.: US 12,034,377 B2
(45) Date of Patent: Jul. 9, 2024

(54) SYSTEMS AND METHODS FOR DIRECT CURRENT POWER DISTRIBUTION

(71) Applicant: Electronic Grid Systems Inc., Edmonton (CA)

(72) Inventors: Zhongyi Quan, Edmonton (CA); Yunwei Li, Edmonton (CA)

(73) Assignee: Electronic Grid Systems Inc., Edmonton (CA)

( * ) Notice: Subject to any disclaimer, the term of this patent is extended or adjusted under 35 U.S.C. 154(b) by 35 days.

(21) Appl. No.: 17/808,706

(22) Filed: Jun. 24, 2022

(65) Prior Publication Data

US 2023/0006568 A1  Jan. 5, 2023

Related U.S. Application Data

(60) Provisional application No. 63/324,743, filed on Mar. 29, 2022, provisional application No. 63/232,978, filed on Aug. 13, 2021, provisional application No. 63/217,012, filed on Jun. 30, 2021.

(51) Int. Cl.
| | |
|---|---|
| *B60L 53/50* | (2019.01) |
| *B60L 53/60* | (2019.01) |
| *B60L 55/00* | (2019.01) |
| *H02J 3/32* | (2006.01) |
| *H02J 3/38* | (2006.01) |
| *H02M 5/458* | (2006.01) |
| *H02M 1/00* | (2006.01) |

(52) U.S. Cl.
CPC ............. *H02M 5/458* (2013.01); *B60L 53/50* (2019.02); *B60L 53/60* (2019.02); *B60L 55/00* (2019.02); *H02J 3/322* (2020.01); *H02J 3/381* (2013.01); *B60L 2210/20* (2013.01); *H02J 2300/24* (2020.01); *H02M 1/0009* (2021.05)

(58) Field of Classification Search
CPC .... H02M 5/458; H02M 1/0009; H02M 5/225; H02M 5/4585; B60L 53/50; B60L 53/60; B60L 55/00; B60L 2210/20; B60L 53/67; H02J 3/322; H02J 3/381; H02J 2300/24; Y02T 10/70; Y02T 10/7072
See application file for complete search history.

(56) References Cited

U.S. PATENT DOCUMENTS

| | | | |
|---|---|---|---|
| 2003/0002310 A1* | 1/2003 | Madenokouji | H02J 3/381 363/132 |
| 2016/0181802 A1* | 6/2016 | Jacobson | H02M 3/02 307/31 |
| 2016/0336749 A1* | 11/2016 | Barker | H02M 5/4585 |

* cited by examiner

*Primary Examiner* — Elim Ortiz
(74) *Attorney, Agent, or Firm* — Bookoff McAndrews, PLLC

(57) ABSTRACT

A direct current (DC) power secondary distribution system is provided. The system comprises at least one first conversion unit and a one or more second conversion units. The first conversion unit receives alternating current (AC) electrical voltage from a distribution transformer of an AC power distribution system and converts the AC electrical voltage to DC electrical voltage output. The one or more second conversion units are connected downstream of the first conversion unit, and each second conversion unit converts the DC electrical voltage output from the first conversion unit to a respective AC electrical voltage output for a respective one or more loads. The one or more loads may be associated with a household.

17 Claims, 27 Drawing Sheets

SYSTEMS AND METHODS FOR DIRECT CURRENT POWER DISTRIBUTION

RELATED APPLICATIONS

The present application claims priority to: U.S. Provisional Patent Application No. 63/217,012 filed Jun. 30, 2021; U.S. Provisional Patent Application No. 63/232,978 filed Aug. 13, 2021; and U.S. Provisional Patent Application No. 63/324,743 filed Mar. 29, 2022, the entire contents of which are incorporated herein by reference.

FIELD

The present disclosure relates to systems and methods for power distribution. More specifically, the disclosure relates to systems and methods for increasing power distribution capacity on secondary power distribution grids.

BACKGROUND

In many jurisdictions, power is distributed at medium voltages through primary feeders, and residential power is distributed over a low voltage secondary power distribution grid. Power is commonly distributed through primary feeders as three-phase alternating current (AC) which is then divided into its constituent phases to be supplied to a group of residences. When entering residential neighborhoods, distribution transformers are commonly used to reduce the voltage of one phase from the primary feeders to voltage levels appropriate for residential household use. Power from the distribution transformer is delivered to the secondary power distribution grid through secondary feeders.

The increasing adoption of residential photovoltaic (PV) systems, residential energy storage (RES) systems and electric vehicles (EVs) present challenges to the power capacity and power quality of existing distribution grids.

Large-scale adoption of EVs significantly increases power demand on secondary power distribution grids in residential areas. In comparison to traditional household electrical loads, an EV charger can increase the peak power demand of a home by a factor of 2 to 10. As a result, capacity of existing secondary power distribution grid infrastructure may become insufficient to handle the charging demand.

The ampacity of existing secondary feeders may also be insufficient as the secondary feeders in most residential systems are sized according to household power loads prior to the advent of EV adoption. Therefore, with increasing adoption of EVs, homeowners and/or utility companies may need to upgrade secondary feeders, which can be very expensive.

Further, the capacity of distribution transformers and primary feeders may also be insufficient to support peak demand. Similar to issues with secondary feeders, existing distribution transformers and primary feeders were sized without considering loads from EV chargers. In certain instances, a single EV in a neighborhood could overload a transformer.

Existing solutions to increase the capacity of distribution grids include upgrading existing elements of the power distribution grid, including secondary feeders, transformers, and primary feeders. These upgrades require significant construction work, including digging up wires, which can be expensive and time consuming. Further, on most systems, these upgrades would need to be carried out on a large scale to become effective.

Power quality has become a significant issue with the increasing use of PV and RES. The increasing adoption of PV systems and RES systems can cause issues such as overvoltage, undervoltage and phase voltage imbalance. Further, PV and RES require power electronic devices in order to connect to the grid, which may induce frequency instability. These power quality issues may undermine the efficiency of the distribution grid and may also result in undesirable blackout events.

There is interest in the power distribution industry for solutions to address power capacity and power quality issues associated with the increased adoption of EVs, PV systems and RES systems.

SUMMARY

The disclosure provides systems and methods for upgrading and/or retrofitting one or more existing secondary power distribution grids. The retrofitted secondary power distribution grid distributes power as direct current (DC) power to increase the capacity of a secondary grid without replacing feeders and transformers. The system includes rectifiers for converting alternating current (AC) voltage from a distribution transformer to direct current voltage. The DC voltage then distributed through the secondary power distribution grid and is converted back to AC using inverters for household use.

In a broad aspect, a DC power distribution system for use with an AC secondary power distribution grid includes one or more first conversion units, one or more second conversion units and one or more controllers. The first conversion units each have a rectifier for receiving AC from a distribution transformer of the secondary power distribution grid and converting AC to DC. The second conversion units each have an inverter for converting DC from the first conversion unit to AC to supply power to a respective household. The controllers are each configured to coordinate the first conversion units and the second conversion units, wherein the one or more controllers at least synchronize voltages and pulse width modulation carrier signals of the inverters of the second conversion units.

According to an aspect, there is provided a direct current (DC) power secondary distribution system comprising: a first conversion unit that receives alternating current (AC) electrical voltage from a distribution transformer of an AC power distribution system and converts the AC electrical voltage to DC electrical voltage output; one or more second conversion units connected downstream of the first conversion unit, wherein each second conversion unit converts the DC electrical voltage output from the first conversion unit to a respective AC electrical voltage output for a respective one or more loads.

In some embodiments, the first conversion unit comprises a rectifier that converts the AC electrical voltage to the DC electrical voltage output; and each of the one or more second conversion units comprises a respective inverter that converts the DC electrical voltage output from the first conversion unit to the respective AC electrical voltage.

In some embodiments, the system comprises a first controller that controls conversion of the AC electrical voltage by the first conversion unit.

In some embodiments, the first conversion unit includes the first controller.

In some embodiments: the first conversion unit comprises at least one sensor configured to take voltage and/or current measurements of the AC voltage from the distribution transformer; and the DC electrical voltage output comprises a variable DC voltage output, and the first controller controls a voltage level of the variable DC voltage output as a function of the measurements.

In some embodiments, controlling the voltage level of the variable DC voltage output comprises selecting between at least two discrete voltage levels.

In some embodiments, the system comprises one or more second controllers that control conversion of the DC electrical voltage output by the one or more second conversion units.

In some embodiments, each of the one or more second conversion units comprises a respective one of the second controllers.

In some embodiments, the one or more second controllers each generate control signals for controlling at least one load of the one or more loads as a function of the variable DC voltage output from the first conversion unit.

In some embodiments, the control signals for controlling the at least one load are for controlling power consumption by the at least one load.

In some embodiments, the control signals for controlling the at least one load are output to a home panel connected to at least one of the one or more second conversion units.

In some embodiments, the at least one load comprises an electric vehicle (EV) charger.

In some embodiments, the at least one load is connected to a DC link of the first conversion unit.

In some embodiments, the one or more second controllers synchronize phase of AC voltage outputs of the one or more second conversion units.

In some embodiments, the one or more second controllers output pulse width modulation (PWM) signals for controlling the one or more second conversion units, and the one or more second controllers synchronize phase of the PWM signals.

In some embodiments, the first controller and the one or more second controllers are connected to a central controller.

In some embodiments, one or more second conversion units are configured for connection to at least one of: a renewable energy source; and an energy storage unit.

In some embodiments, the system further comprises one or more DC-DC converters, each DC-DC converter connected intermediate a respective one of the first conversion units and one of the second conversion units.

In some embodiments, at least one of the second conversion units comprises a DC-DC converter connected to a DC side of the inverter.

According to another aspect, there is provided a method comprising: converting, by a first conversion unit, alternating current (AC) electrical voltage from a distribution transformer of an AC power distribution system to direct current (DC) electrical voltage output; and converting, by one or more second conversion units downstream of the first conversion unit, the DC electrical voltage output from the first conversion unit to one or more AC electrical voltage outputs for a respective one or more loads.

In some embodiments, the DC electrical voltage output is a variable DC voltage output, and the method further comprises controlling power consumption of the one or more loads as a function of the variable DC voltage output.

In some embodiments, the method further comprises: taking measurements of current and/or voltage of the electrical voltage from a distribution transformer; and controlling a voltage level of the variable DC voltage output as a function of the measurements.

In some embodiments, the one or more second conversion units comprise two or more conversion units, and the method further comprises synchronizing at least one of: phases of the AC voltage outputs of the two or more second conversion units; or phases of pulse width modulation (PWM) signals that control the conversion of the DC electrical voltage by the two or more second conversion units.

According to another aspect, there is provided a method comprising retrofitting an alternating current (AC) power distribution system with the DC power secondary distribution system as described above or below.

Other aspects and features of the present disclosure will become apparent to those ordinarily skilled in the art upon review of the following description of the specific embodiments of the disclosure.

DETAILED DESCRIPTION

In many jurisdictions, electrical power is transmitted at medium voltages over a primary power distribution grid, and residential electrical power is provided using a low voltage secondary power distribution grid. Power is commonly distributed as three-phase alternating (AC) over primary feeders at voltages that can be between 2 kV to 35 kV or greater. When entering residential neighborhoods, distribution transformers are used to reduce the voltage of the electrical power from the primary feeders to voltage levels appropriate for residential household use (e.g. 120V/240V). The lowered-voltage power output by the distribution transformers may be distributed to households or commercial buildings over the secondary power distribution grid. For example, each distribution transformer may typically service between about 1 to 15 homes.

In jurisdictions such as North America, distribution transformers operate on a single phase, representing one of three-phases of the AC power from the primary feeders. Power from the distribution transformer is delivered to the secondary power distribution grid using secondary feeders. The term "feeder" as used herein may refer to power lines through which electrical power is transmitted. Typically, secondary feeders may comprise two powered conductors and one neutral line.

Figure 1:
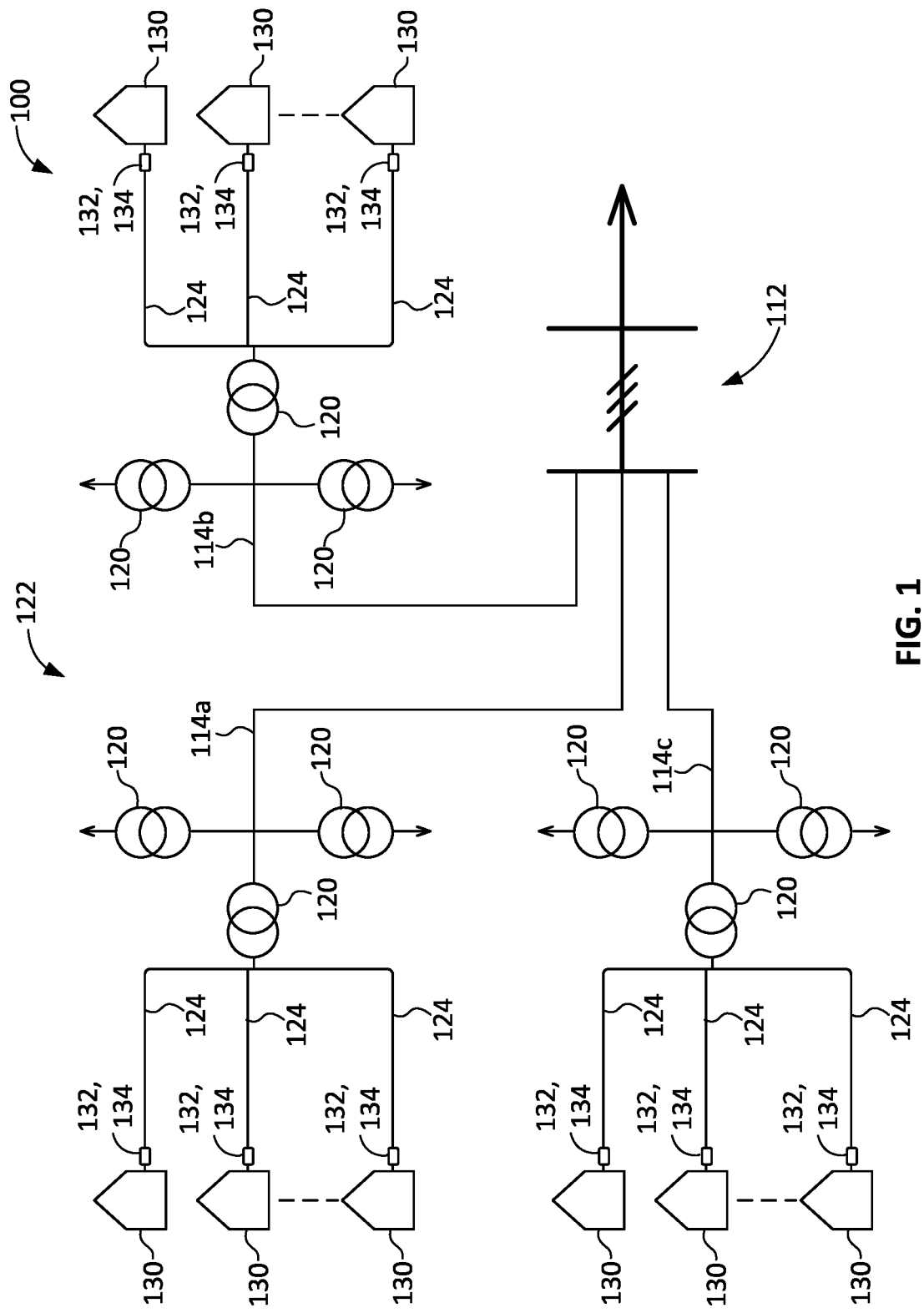
FIG. 1 is a schematic block diagram of an example AC power distribution system.

In the drawings described below, like reference numbers denote like elements. FIG. 1 is a schematic block diagram of an example AC power distribution system 100. The system 100 comprises a primary feeder 112 and a secondary power distribution grid 122. The primary feeder 112 may supply three-phase AC power.

In some embodiments, the primary feeder 112 comprises three primary feeder lines 114a, 114b, 114c, each comprising a respective one of three phases of the three-phase AC power. Each of the primary feeder lines 114a, 114b, 114c is connected to at least one distribution transformer 120. In FIG. 1, each of the primary feeder lines 114a, 114b, 114c is shown connected to three distribution transformers 120, but the number of distribution transformers 120 may vary. Each distribution transformer 120 lowers the voltage of the AC power, thereby providing low voltage electrical power. The term "low voltage electrical power" as used herein refers to electrical power having a voltage sufficiently low for use in residential or commercial buildings. The low voltage electrical power from each distribution transformer is then supplied to a respective group of homes 130 via respective secondary feeders 124 for residential service. In some embodiments, the secondary feeders 124 are connected to electrical panels 132 and meters 134 proximate the homes 130.

Figure 2:
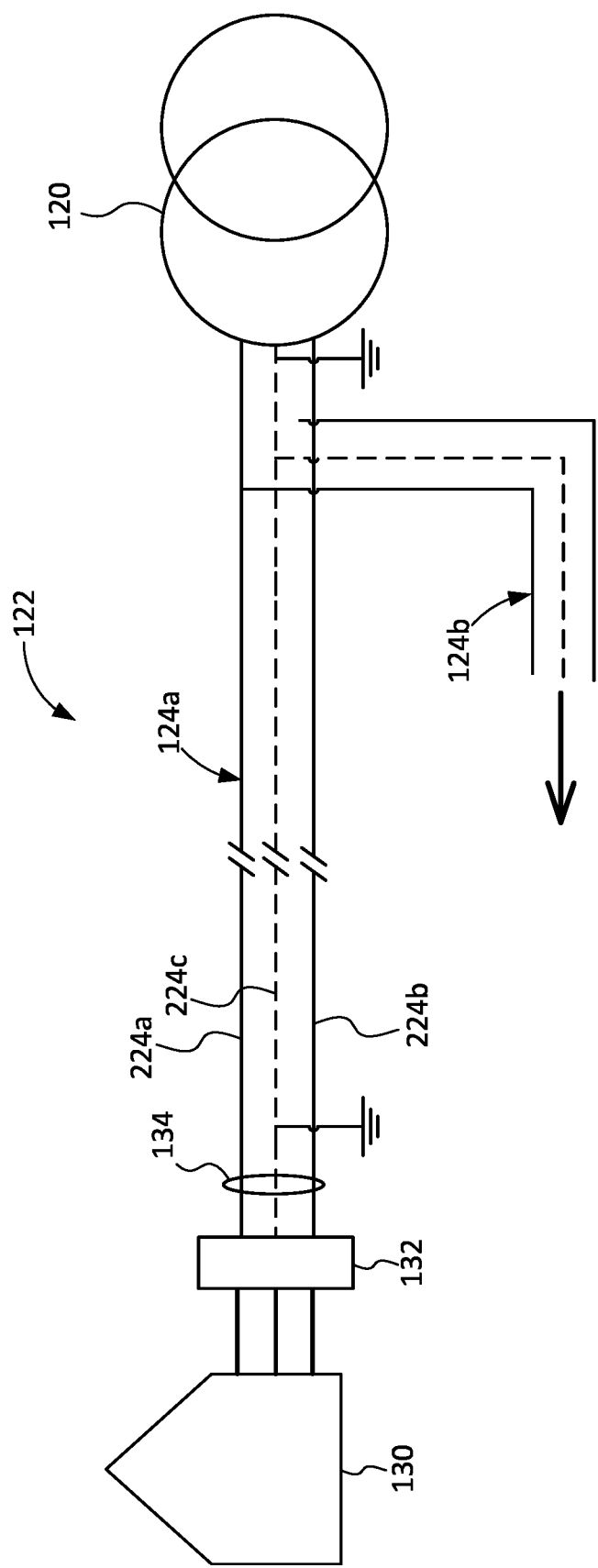
FIG. 2 is a partial schematic block diagram of the secondary power distribution grid of FIG. 1.

FIG. 2 is a partial schematic block diagram of the secondary power distribution grid 122 of FIG. 1. Referring to FIG. 2, in some embodiments, power from a distribution transformer 120 of the secondary power distribution grid 122 is supplied to a home 130 via a secondary feeder 124a. The secondary feeder 124 in may comprise first and second conductor lines 224a, 224b and one neutral (or ground) line 224c. In some embodiments, the conductor lines 224a, 224b and the neutral line 224c are connected to a meter 134 and an electrical panel 132 associated with the home 130. In North America, there is commonly a 120V difference in potential between the first conductor line 224a and the neutral line 224c as well as a 120V difference in potential between the neutral line 224c and the second conductor line 224b, such that there is a 240V difference in potential between the first conductor line 224a and the second conductor line 224b. One or more other secondary feeders 124b may carry power to homes.

Figure 3:
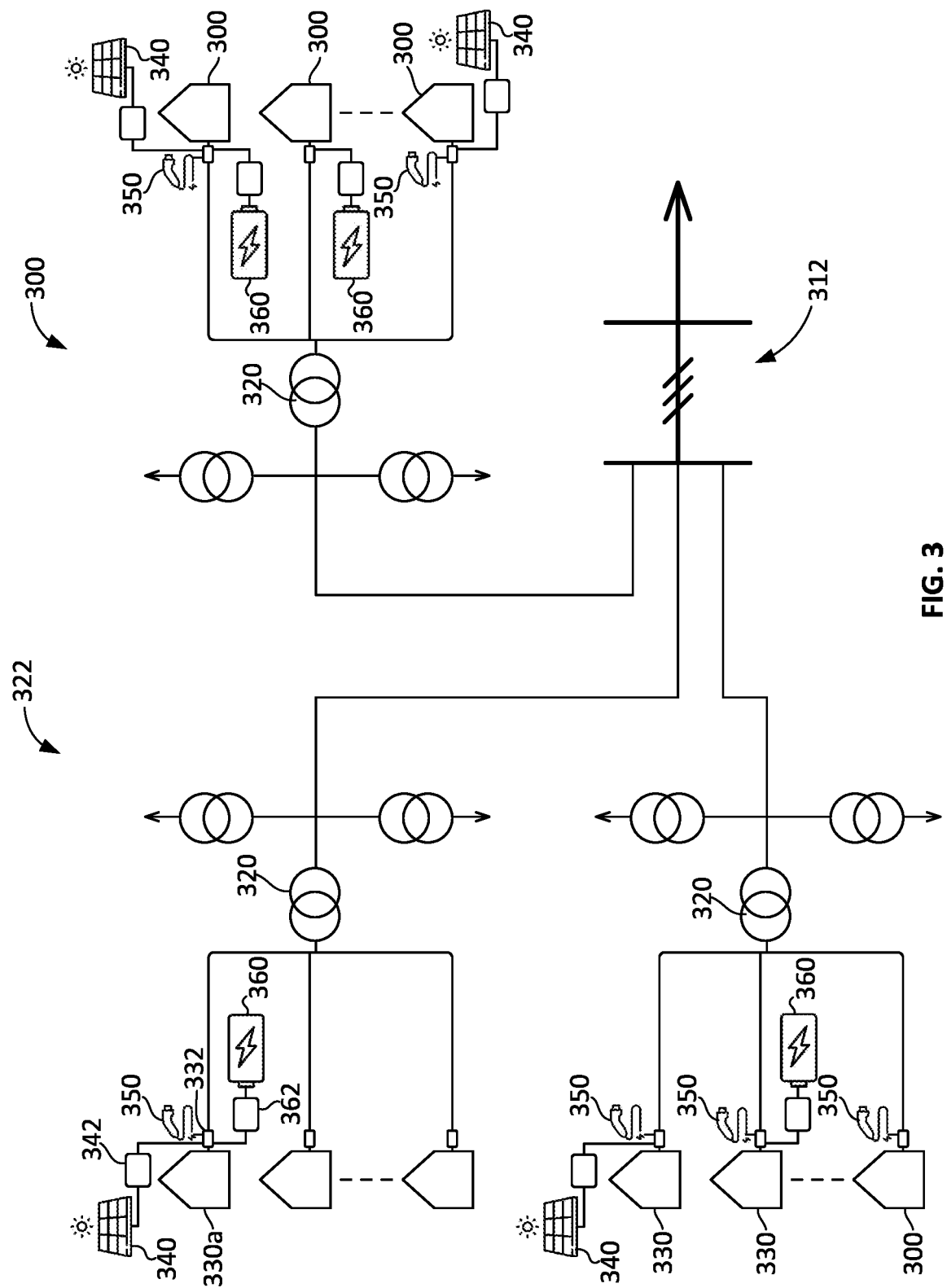
FIG. 3 is a schematic block diagram of another example AC power distribution system.

FIG. 3 is a schematic block diagram of another example AC power distribution system 300 including a primary feeder 312, transformers 320, and a secondary power distribution grid 322. The secondary power distribution grid 322 is similar to the secondary power distribution grid 122 of FIG. 1. FIG. 3 further shows residential photovoltaic (PV) systems 340, electric vehicle (EV) chargers 350 and residential energy storage (RES) systems 360 that are coupled to or associated with corresponding homes 330. For example, the residential PV systems 340, EV chargers 350 and RES systems 360 may each be coupled (directly or indirectly) to the electrical panel 332 of the corresponding home 330.

Example house 330a shown in FIG. 3 has each of a residential PV system 340, an EV charger 350 and an RES system 360 associated therewith. The residential PV system 340 may comprise solar panels. The residential PV system 340 is connected to a PV inverter 342. The PV inverter 342 is connected intermediate the residential PV system 340 and the electrical panel 332 of the house 330a in order to convert direct current (DC) voltage from the residential PV system 340 to AC voltage. Similarly, an RES inverter 362 is connected intermediate the RES system 360 and the electrical panel 332 of the house 330a. The other residential PV systems 340, EV chargers 350 and RES systems 360 associated with other houses 330 in FIG. 3 are similarly configured.

The increased adoption of residential PV systems, EVs and RES systems presents capacity and power quality issues on existing power distribution grids. To address these issues, in some embodiments, at least some of the distribution on a secondary distribution grid is transitioned from AC power to DC power.

Figure 4:
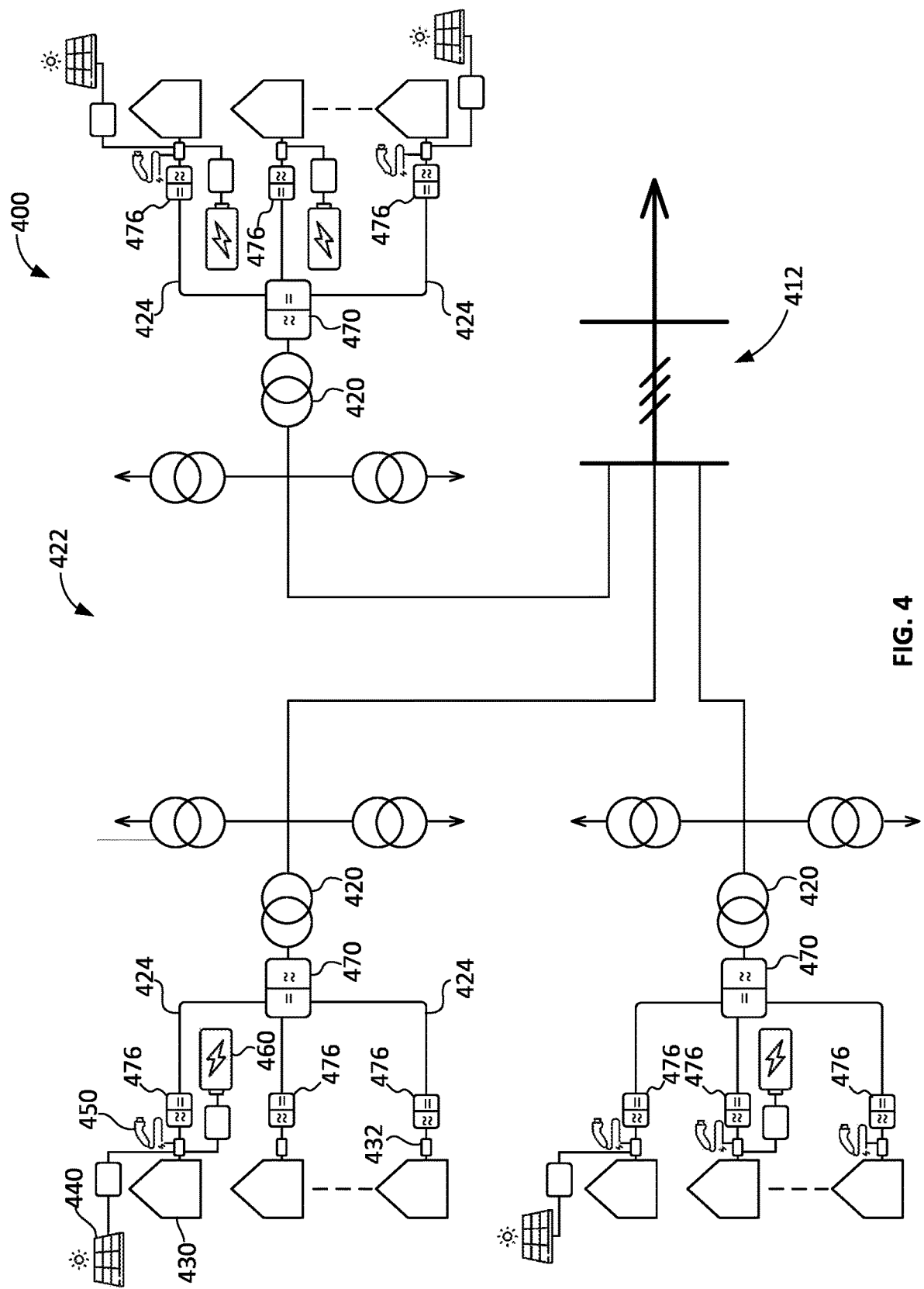
FIG. 4 is a schematic block diagram of an example power distribution system including an AC primary feeder and a DC secondary power distribution grid.

FIG. 4 is a schematic block diagram of an example power distribution system 400 including a primary feeder 412 and a secondary power distribution grid 422. Again, homes 430 may have associated therewith one or more of a residential PV system 440, an EV charger 450 and a RES system 460.

The secondary power distribution grid 422 comprises a plurality of first conversion units 470 and second conversion units 476. The second conversion units 476 are connected downstream (electrically) of the first conversion units 476. The first conversion units 470 may each comprise a respective rectifier, and the second conversion units 476 may each comprise a respective inverter. The first conversion units 470 convert AC electrical voltage to DC electrical voltage output, while the second conversion units 476 convert DC electrical voltage output from the first conversion units 470 to AC electrical voltage respective one or more loads associated with homes 430.

Each first conversion unit 470 may be coupled to and positioned proximate a corresponding one of the distribution transformers 420 to receive AC power therefrom. Each first conversion unit 470 may be coupled via one or more secondary feeders 424 to one or more secondary conversion units 476. The ratio of first conversion units 470 to secondary conversion units 476 and homes 430 may vary. Each distribution transformer 420 and first conversion unit 470 may, as an example, service between 1 to 15 homes. The secondary feeders 424 each carry DC power from the first conversion unit 470 to a respective secondary conversion unit 476. The secondary conversion units 476 each output AC voltage to the electrical panel 432 of a respective one (or more) of the homes 430. Thus, at least a portion of power distribution in the secondary power distribution grid 422 is accomplished via transmission of DC power.

The secondary power distribution grid 422 may be created by retrofitting an existing AC secondary power distribution grid (such as the grid 322 shown in FIG. 3) with the first conversion units 470 and second conversion units 476. The retrofit may be carried out by installing first conversion units 470 proximate corresponding distribution transformers 420. Existing secondary feeders 424 may each be disconnected from distribution transformers 420 and reconnected on a DC side of a respective rectifier 470, while the AC side of the respective rectifier 470 is connected to the corresponding distribution transformer 420. The second conversion units 476 may each be installed proximate a corresponding home 430 to convert DC voltage back to AC voltage prior to power delivery to the homes 430. This conversion back to AC voltage may avoid or lessen any impact on the power supply needs of the household.

The conversion of a secondary power distribution grid to a DC grid by converting AC voltage from a distribution transformer to DC voltage for distribution may increase the capacity of the secondary distribution grid. For example, in North America, an existing AC secondary distribution grid has a voltage of 240V. If the ampacity of the secondary feeder is 100 A, the power capacity of the secondary distribution grid to each home is 24 kVA. Currently, to increase the capacity of a secondary power grid, secondary feeders are replaced with cable with a higher ampacity. By distributing power in DC, voltage may be increased to approximately 480V using the same secondary feeders to approximately double the capacity of the secondary distribution grid using the same 100 A secondary feeder. Conversion to a DC grid may permit upgrading the capacity of a secondary power distribution grid with a reduced need for construction. Further, conversion allows upgrading of individual homes or neighborhoods providing further potential time and cost savings or deferrals.

Figure 5:
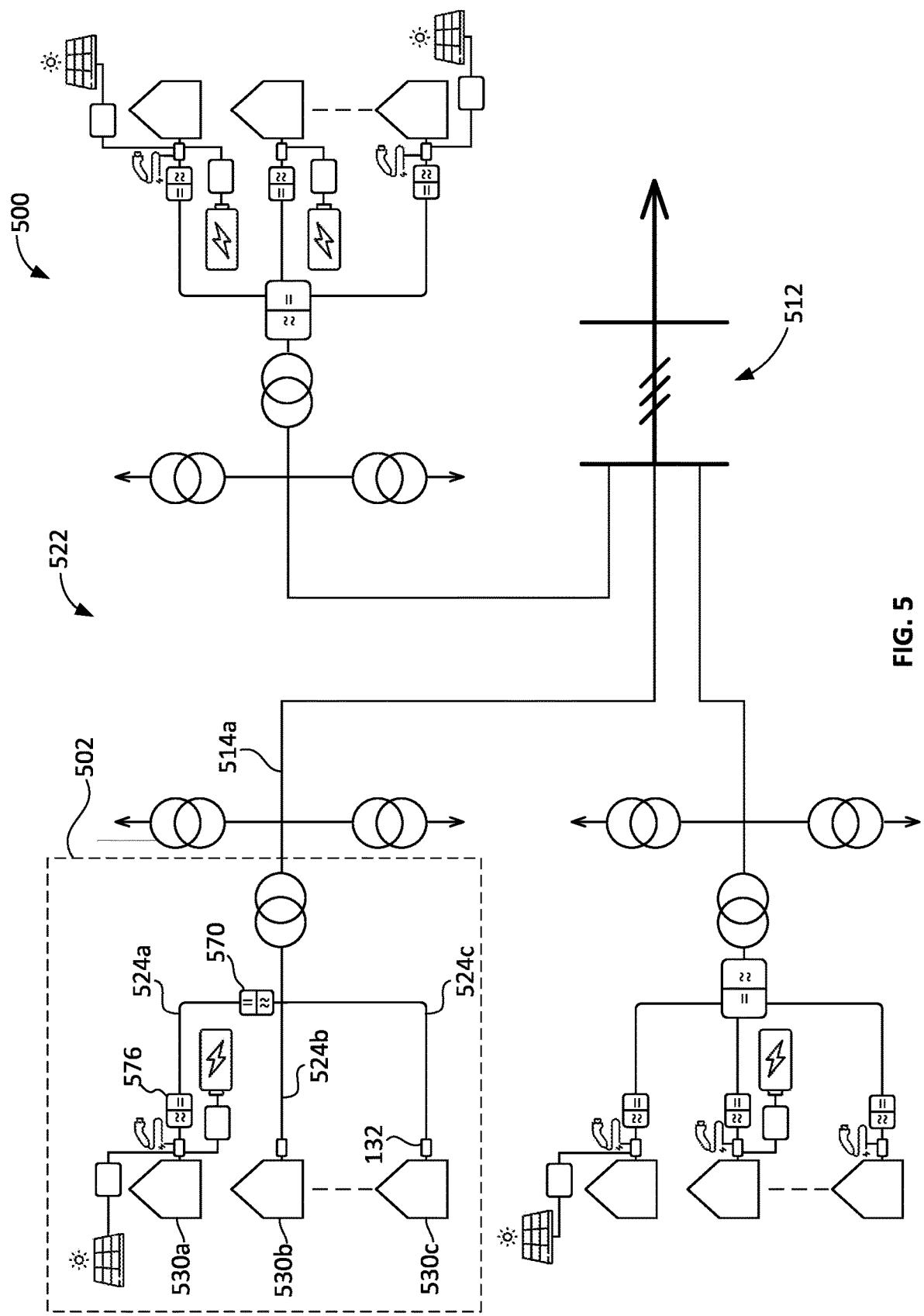
FIG. 5 is a schematic block diagram of an example power distribution system including an AC primary feeder and a partial secondary DC power distribution grid.

FIG. 5 is a schematic diagram of another example power distribution system 500 including a primary feeder 512 and a secondary power distribution grid 522. The system 500 of FIG. 5 is similar to the system 400 in FIG. 4. One neighborhood 502 is shown receiving power via the primary feeder line 514*a*. Within the neighborhood 502, only distribution to one home 530*a* is upgraded with first and second conversion units 570 and 576, such that DC power is carried over secondary feeder line 524*a*. Other homes 530*b*, 530*c* in the same neighborhood 502 continue to use an existing AC secondary distribution via feeder lines 524*b*, 524*c* of the grid 522. The first conversion unit 570 comprises a rectifier and the second conversion unit 576 comprises an inverter in this embodiment.

Figure 6:
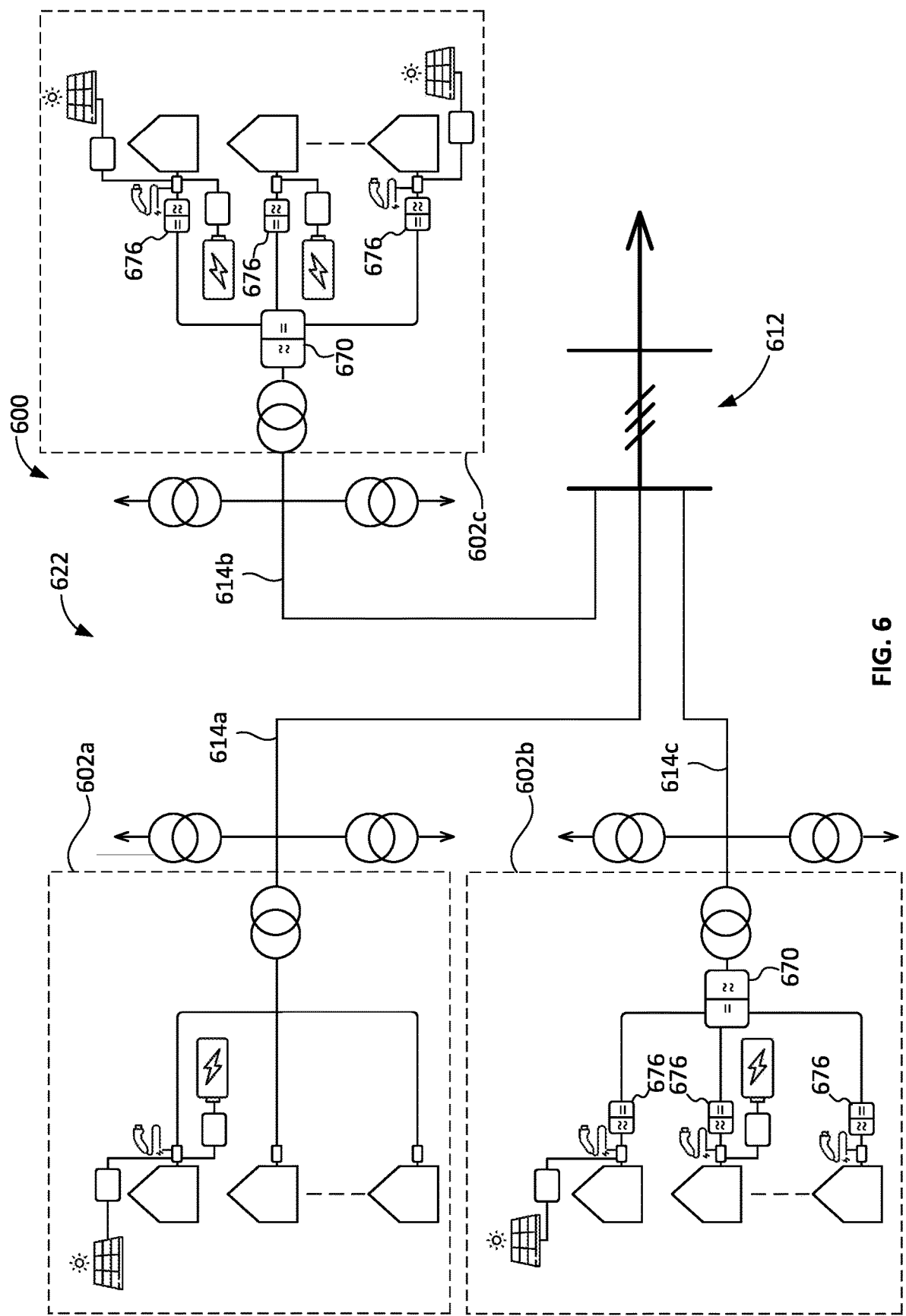
FIG. 6 is a schematic block diagram of another example power distribution system including an AC primary feeder and a partial secondary DC power distribution grid.

FIG. 6 is a schematic block diagram of another example power distribution system 600 including a primary feeder 612 and a secondary power distribution grid 622. In this embodiment, the system 600 again includes multiple neighborhoods 602*a*, 602*b* and 602*c*, which are associated with primary feeder lines 614*a*, 614*b* and 614*c* respectively. Two neighborhoods 602*b* and 602*c* are shown upgraded with first conversion units comprising rectifiers 670 and second conversion units comprising inverters 676 configured for DC power distribution. Another neighborhood 602*a* associated with primary feeder line 614*a* continues to use the existing AC secondary distribution infrastructure.

Converting or retrofitting secondary distribution grids to utilize DC power distribution can also result in an improvement in power quality. As homes are decoupled from the AC power distribution infrastructure using rectifiers and inverters, power supply voltage and frequency to each home can be maintained at optimum levels through proper control of inverters, regardless of the voltage quality and frequency of the AC primary power distribution grid. Further, PV systems and RES systems in the associated neighborhoods may also be decoupled from the AC power grid by the rectifiers and inverters, and their impact on the power quality of the primary AC grid may be significantly reduced.

By controlling a rectifier proximate a distribution transformer, the power quality of an AC power grid may be improved. Rectifiers can also provide ancillary services such as reactive power generation and transformer monitoring. Centralized control of distributed rectifiers in different neighborhoods may also allow distribution grid operators to improve the efficiency and power quality of the entire distribution grid. In some embodiments, the DC power grid can operate within a range of grid voltages. During peak hours, the grid voltage can be regulated by adjusting the rectifiers to control the amount of reactive power injected to or absorbed from the distribution grid to keep the grid voltage towards the higher range of voltages. As the current flowing through the primary feeders decreases, the line losses may be reduced. This can also be used to control the power factor of rectifiers to ensure the entire distribution grid is operating at a higher power factor range. Further, rectifiers can be used to absorb certain low order harmonics on the distribution grid injected by industrial, commercial or residential loads to reduce harmonics on the distribution grid.

Figure 7:
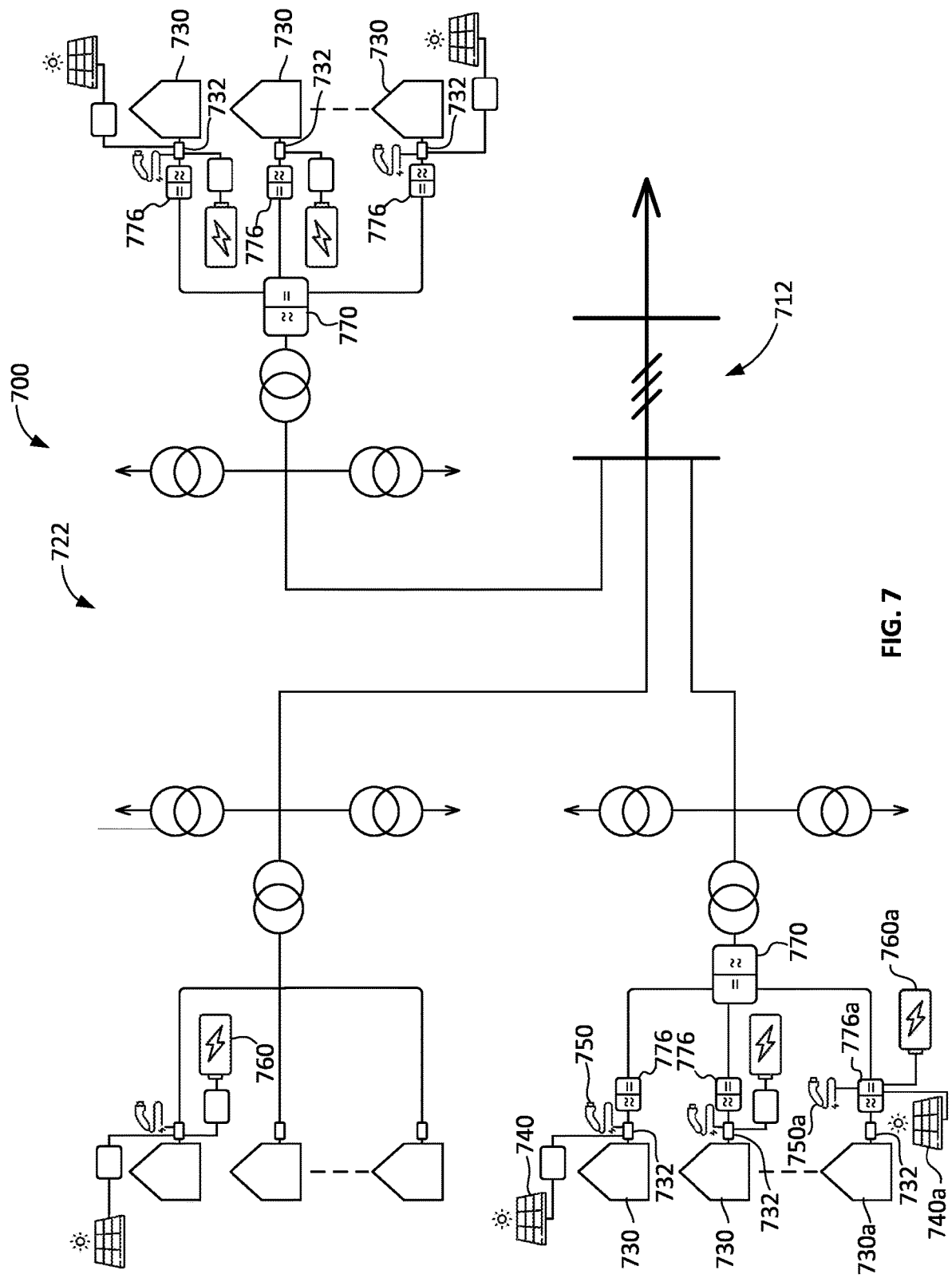
FIG. 7 is a schematic block diagram of yet another example power distribution system including an AC primary feeder and a partial secondary DC power distribution grid.

FIG. 7 is a schematic block diagram of yet another example power distribution system 700 including a primary feeder 712 and a secondary power distribution grid 722. The system 700 of FIG. 7 is similar to the system 600 of FIG. 6 in that rectifiers 770 and inverters 776 configured for DC power distribution. Also like FIG. 6, the system 700 includes some homes 730 coupled to one or more of a PV system 740, an EV charger 750, and/or a RES system 760 via the electrical panel 732 on the AC side of the corresponding inverter 776.

FIG. 7 also illustrates another optional configuration. For home 730*a*, a DC EV charger 750*a* is coupled to the secondary power distribution grid 722 on the DC side of the corresponding inverter 776a. The DC charger 750 may provide a vehicle-to-house (V2H) function to supply power to the corresponding home 730. As also shown, a residential PV system 740a and an RES system 760a are also connected to the DC side of the coupled to the secondary power distribution grid 722 on the DC side of the corresponding inverter 476a. One or more other loads or devices may also be coupled to grid 722 on the DC side of the corresponding inverter 776.

In the event of a power outage or any faults on the primary feeder side, the rectifier 770 may be disconnected from the transformer to isolate the neighborhood from the power grid. In this case, the neighborhood can be powered by various other power sources such as a PV system, an RES system, and/or a car battery through the V2H function of an EV charger. These steps are not limited to the embodiment of FIG. 7, but may also be taken to isolate the neighborhood from the power grid in other embodiments described herein.

FIGS. 4 to 7 illustrate embodiments of secondary power grids 422, 522, 622 and 722 upgraded with DC grid conversion. In some embodiments, DC grid conversion generally includes adding an AC to DC conversion stage (e.g. first conversion unit 470, 570, 670, 770 comprising a rectifier) between a distribution transformer and a secondary feeder and a DC to AC conversion stage (e.g. second conversion unit 476, 576, 676, 776 comprising an inverter) being added proximate each home between a home meter and a secondary feeder.

In some embodiments, to address the issue of grounding leakage current, inverters in a secondary power distribution system have synchronized phase of AC voltages and pulse width modulation (PWM) carrier signals (i.e. the phase of the PWM carrier signals may be synchronized). The inverters may be PWM inverters, which is a type of inverter whose functionality is controlled by PWM control signals. The control signals may be generated by an inverter controller.

Figure 8:
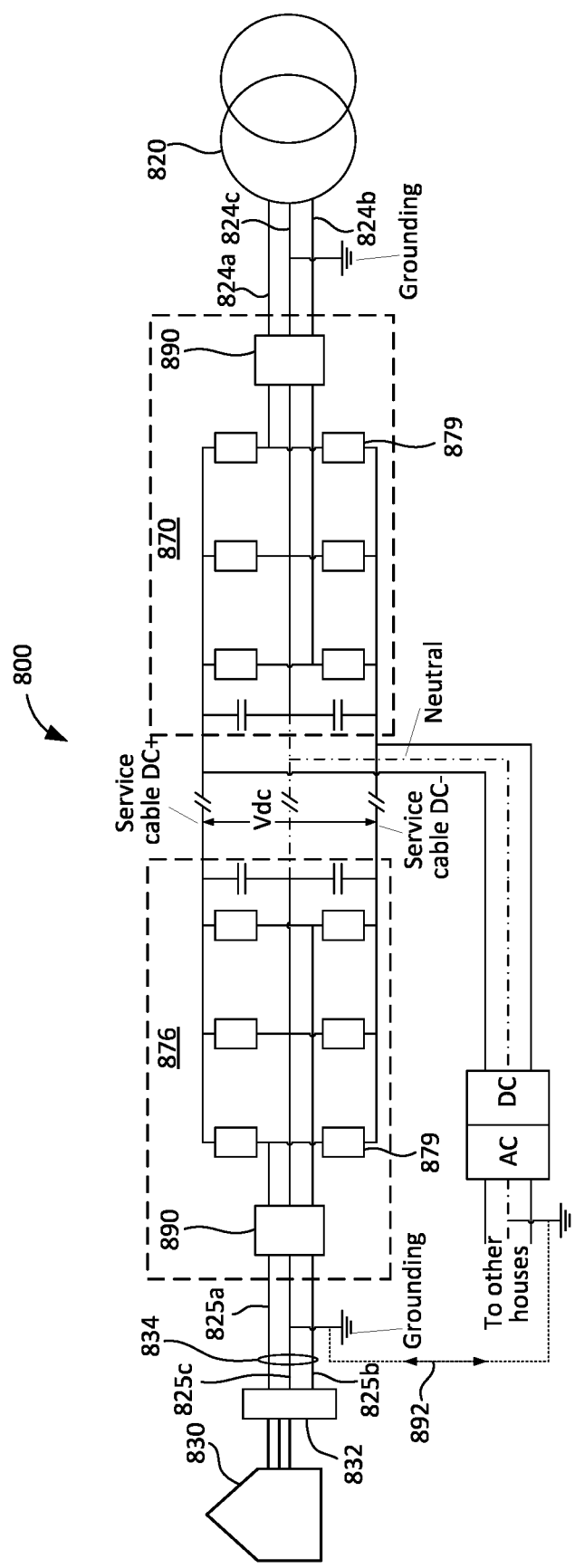
FIG. 8 is a schematic block diagram of an example DC secondary distribution system (SDS)

FIG. 8 is a schematic block diagram of an example DC secondary distribution system (SDS) 800 for distributing power between a distribution transformer 820 and a home 830. The "home 830" is used to denote any electrical loads to which electrical power is supplied by the DC SDS. The skilled person will appreciate that not all appliances or other electrical loads will necessary be inside a physical house or other residential structure.

The system 800 further comprises an electrical panel 832 and a meter 834. The DC SDS 800 comprises a first conversion unit comprising a rectifier 870, and a second conversion unit comprising an inverter 876. AC conductor lines 824a, 824b and a neutral (or ground) line 824c connected between the transformer 120 and the rectifier 870. AC conductor lines 825a, 825b and ground or "neutral" line 825c are connected between the electrical panel 832 and the inverter 876. To account for imbalanced current in the exemplified split phase operation in North America, three-leg single phase topology may be used for both the inverter and rectifier. In some embodiments, other topologies may be used. For example, three-level converters, multi-level converters and two-leg single phase converters.

Referring to FIG. 8, leakage current may flow through a leakage current path 892 between groundings if there is a phase mismatch between the inverters 876 of different houses. The mismatch can be the result of phase differences between two AC supply voltages for the two homes and/or carrier phase angle of the PWM signals for the inverters 876 of different houses. Leakage current can be hazardous to homeowners.

FIG. 8 shows example circuitry of the rectifier 870 and the inverter 876. The rectifier 870 includes a filter 890 and a plurality of power semiconductor devices 879 (e.g., power transistors) arranged to convert AC voltage to DC voltage. The inverter 876 comprises similar circuitry but arranged to convert DC voltage to AC voltage. The exact circuitry and configuration of the rectifier 870 and the inverter 876 may vary in other embodiments. The inverter 876 and/or rectifier 870 may each further include or be coupled to control circuitry, such as inverter controller 1951 or rectifier controller 2051 shown in FIGS. 19A to 20B. The rectifiers (470, 570, 670, 770) of FIGS. 4 to 7 may be in the form of the rectifier 870 of FIG. 8. The inverters (476, 576, 676, 776) of FIGS. 4 to 7 may be in the form of the rectifier 870 of FIG. 8.

Figure 9:
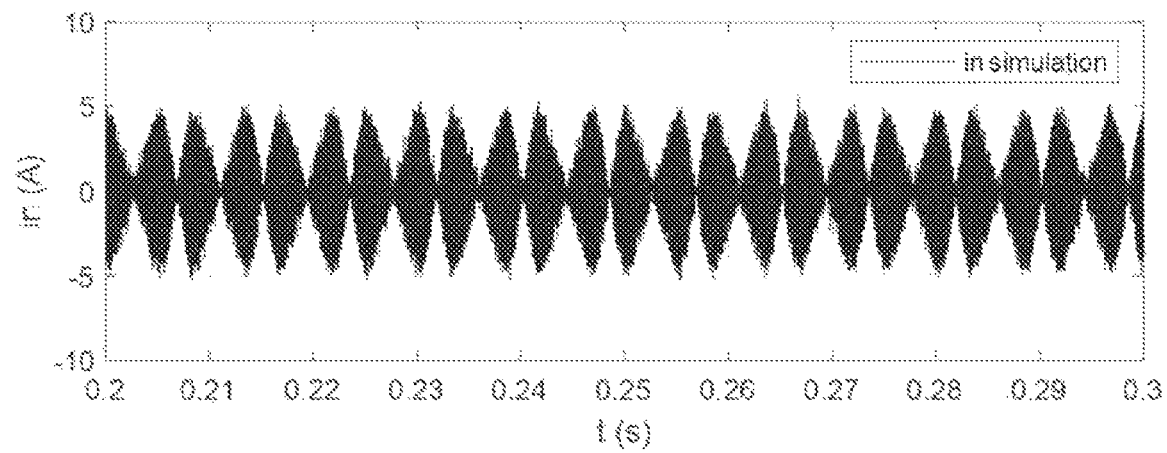
FIG. 9 is a graph showing simulation results of leakage current when two supply voltages are 60 degrees out of phase.
Figure 10:
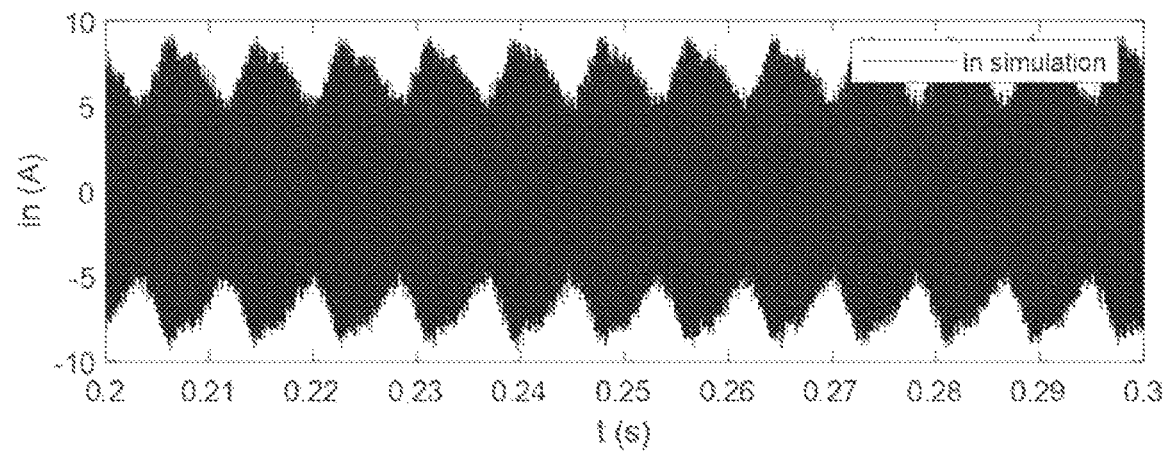
FIG. 10 is a graph showing simulation results of leakage current when pulse width modulation carriers of two inverters are 45 degrees out of phase and when two supply voltages are 90 degrees out of phase.

FIG. 9 illustrates simulation results of leakage current (in) when two supply voltages are 60 degrees out of phase. Peak-to-peak leakage current is 10 A. FIG. 10 illustrates simulation results of leakage current (in) when PWM carriers of two inverters are 45 degrees out of phase and when two supply AC voltages are 90 degrees out of phase. In this case, peak-to-peak leakage current (in) is 19A.

Figure 11:
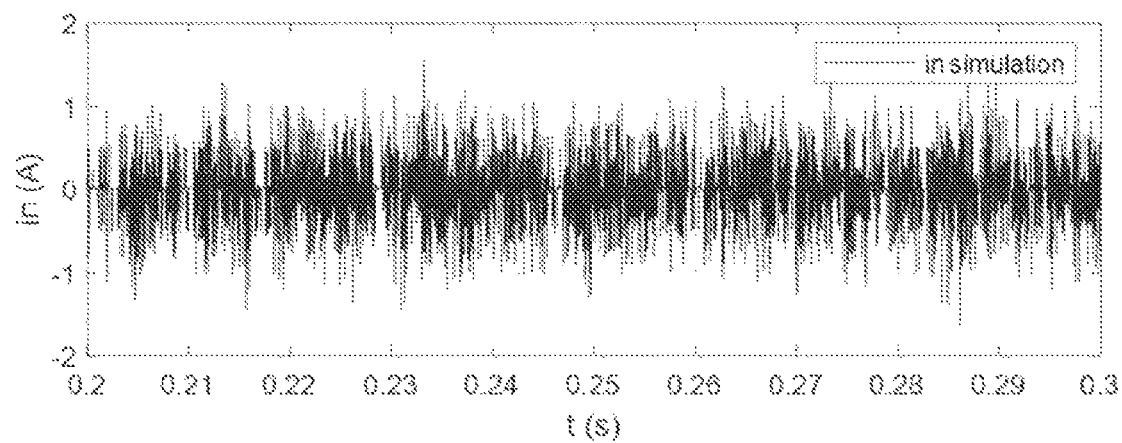
FIG. 11 is a graph showing simulation results of leakage current with synchronized supply voltages and pulse width modulation carriers.

In some embodiments, to minimize leakage current, supply voltages to all homes are synchronized and the phase of the PWM carrier signals of all inverters are synchronized. With synchronized supply voltages and PWM carrier signals, leakage current can be kept at a low level, as illustrated in FIG. 11. FIG. 11 illustrates simulation results of leakage current (in) when supply voltages are synchronized and PWM carriers of all inverters are synchronized.

In some embodiments, controllers using phase-lock loop processes are used to synchronize the supply voltages. However, when there are a large number of homes and inverters, synchronization can be difficult. Synchronization requires inverters to have real-time information relating to the voltage of other inverters. This can be done by transmitting voltage information between controller of multiple inverters. The voltage information may be transmitted using fiber optic cables, for example. As the physical distance between inverters can be large and the number of inverters on a system can be large, performance may be affected. Further, PWM carrier signals operate at high carrier frequencies, such as in the 10 kilo-Hertz level or higher range. This may make synchronization challenging especially when there is a large physical distance between inverters.

Figure 12:
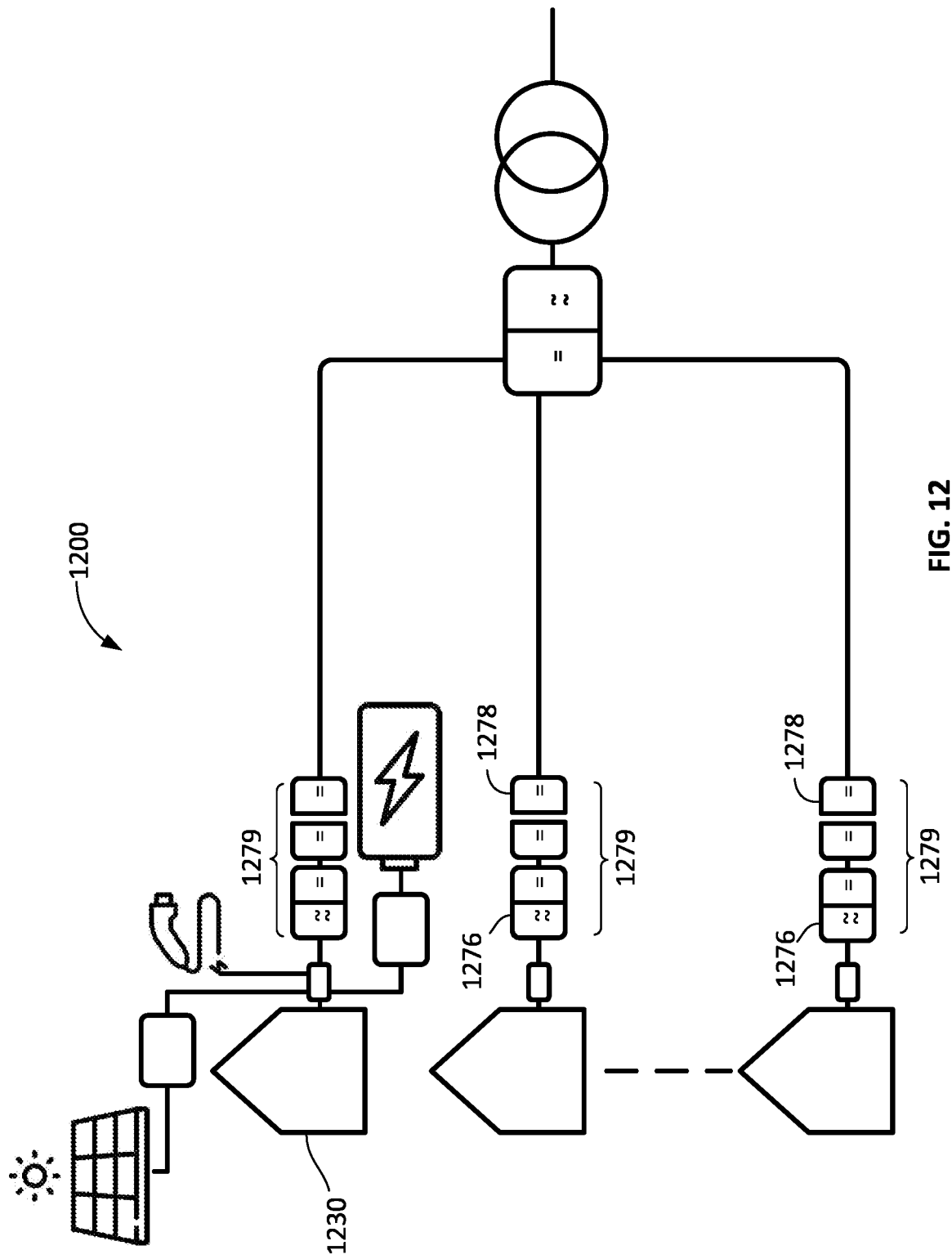
FIG. 12 is a schematic block diagram of another example DC SDS including isolating DC-DC converters.

An alternative approach to address leakage current is to integrate galvanic isolation in the DC SDS by using high-frequency isolated DC-DC converters. Depending on the relative arrangement of DC-DC converters, at least two alternative DC SDS architectures can be provided. FIG. 12 is a schematic block diagram of a DC SDS 1200 illustrating an architecture with DC-DC converters 1278 proximate a home 1230. A second conversion unit comprising an inverter 1276 and a DC-DC converter 1278 for each home 1230 can be integrated as a demand side inverter (DSI) 1279.

Figure 13:
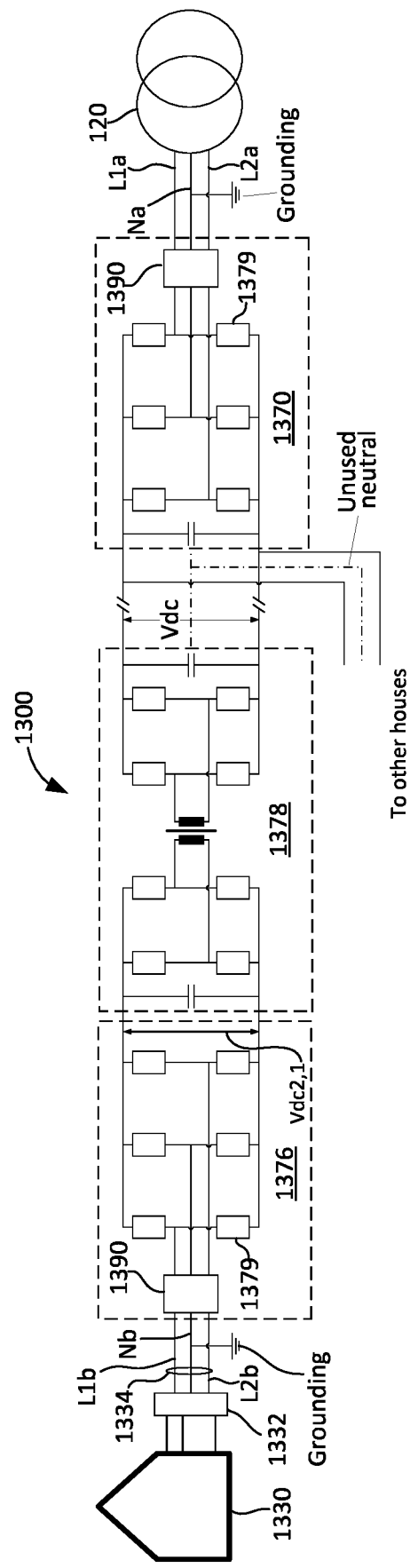
FIG. 13 is a schematic diagram of yet another example DC SDS.

FIG. 13 is a schematic diagram of an example DC SDS 1300 for distributing power between a distribution transformer 120 and a home 1330. The system 1300 further comprises an electrical panel 1332 and a meter 1334, as shown. The DC SDS 1300 comprises a first conversion unit comprising a rectifier 1370, and a second conversion unit comprising an inverter 1376.

Conductor lines L1a, L1b, and a neutral line Na connected between the transformer 120 and the rectifier. Conductor lines L2a, L2b and ground line Nb are connected between the electrical panel 1332 and the inverter 1376. FIG. 13 illustrates split phase in a neighborhood including a meter 1334, and a panel 1332. The "home 1330" is used to denote any electrical load devices to which electrical power is supplied by the DC SDS. The skilled person will appreciate that not all appliances or other electrical loads will necessary be inside a physical house or other residential structure.

Like the example in FIG. 8, the rectifier 1370 and inverter 1376 each include a respective filter 1390 and a respective plurality of power semiconductor devices 1379. Other forms of rectifiers and inverters may be used in other embodiments.

The DC SDS 1300 further includes DC-DC converter 1378 intermediate the rectifier 1370 and inverter 1376. The DC-DC converter 1378 is configured similar to the DC-DC converter 1278 of FIG. 12. The DC-DC converter 1378 is shown by way of example, but other isolated converter circuitry may be used in other embodiments. The DC-DC converter may typically be bi-directional. However, unidirectional converters may be used in other embodiments.

The system 1300 in FIG. 13 is shown by way of example. It is noted that other power converter topologies may also be used. With an isolated DC-DC converter for each home, the leakage current path is cut off. Therefore, leakage current can be significantly reduced. For the system shown in FIG. 12, the DC link voltage for all homes is kept the same.

Figure 14:
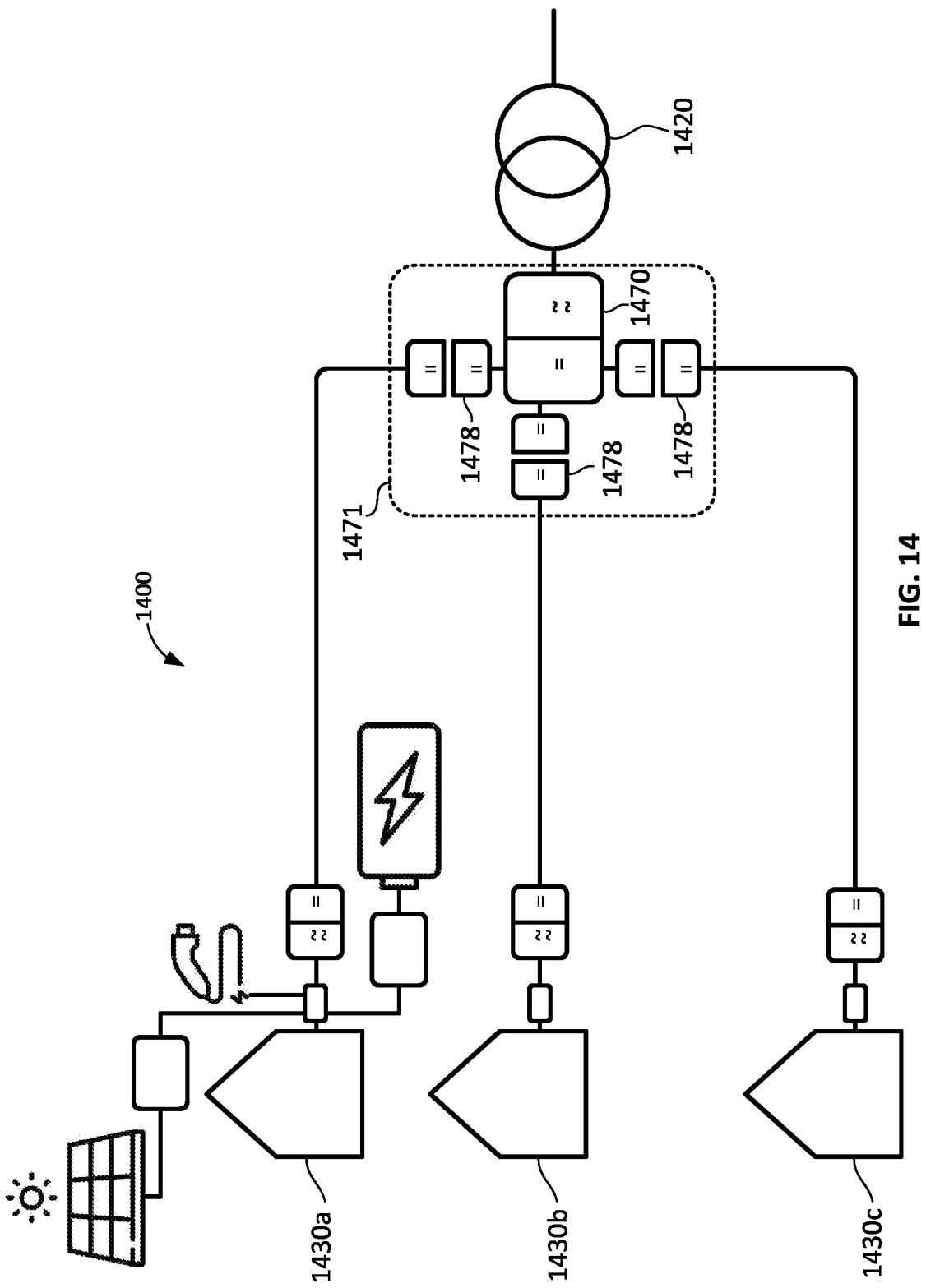
FIG. 14 is a schematic diagram of yet another example DC SDS.

FIG. 14 illustrates another DC SDS system architecture 1400 with isolated DC-DC converters 1478 placed proximate a transformer 1420 for an alternative DC SDS architecture. In this architecture, each home 1430 still has a dedicated DC-DC converter 1478 and therefore, leakage current can be significantly reduced. The DC-DC converters 1478 and a first conversion unit comprising a rectifier 1470 proximate the transformer 1420 can be integrated as a transformer side converter (TSC) 1471.

For the architecture illustrated in FIG. 14, the DC-DC converters 1478 can operate differently and the homes 1430a, 1430b, 1430c can be configured to receive different DC voltages. Time shifting is also possible allowing distributing load on the overall power grid over time.

Figure 15:
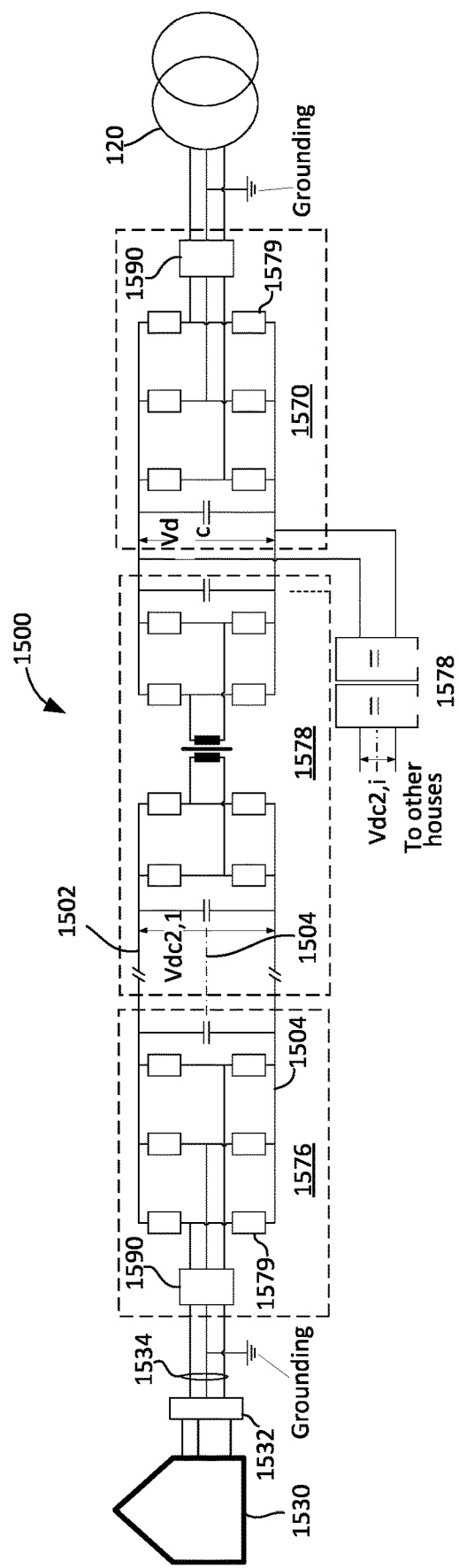
FIG. 15 is a schematic diagram of still another example DC SDS.

FIG. 15 is a schematic diagram of an example DC SDS 1500 for distributing power between a distribution transformer 120 and a home 1530. The system 1500 further comprises an electrical panel 1532 and a meter 1534, as shown. The DC SDS 1500 comprises a first conversion unit comprising a rectifier 1570, and a second conversion unit comprising an inverter 1576, and DC-DC converter 1578. The system 1500 of FIG. 15 is similar to the example of FIG. 13, but shows a different location of DC-DC converter 1578 proximate the service transformer. Service cable DC+ (1502), service cable DC− (1504), and unused neutral line (1506) are also labeled in FIG. 15. The inverter 1576 and rectifier 1570 each include a respective filter 1590, and a respective plurality of power semiconductor devices 1579. It is noted that other power converter topologies may also be used.

The system architectures illustrated in FIGS. 8 and 12 to 15 may be used to convert power distribution for individual homes in a neighborhood and/or entire individual neighborhoods within a larger scale power distribution system.

In some embodiments described herein, each inverter, rectifier, DC-DC converters, DSI and/or TSC can comprise a respective single power electronics converter or a respective plurality of power electronic converters in parallel. In each power electronic converter, each power semiconductor device, e.g., IGBT, MOSFET, HEMT, can comprise a single device, multiple devices in parallel, or multiple devices in series.

In some embodiments, each power converter (e.g. inverter, rectifier, DSI, and TSC) may have its own controller, which is not shown in the figures. In some embodiments, a controller for a power converter controls the current/voltage in a closed loop control manner. In some embodiments, the controller can generate the PWM signals to turn on and off the power semiconductors, e.g., MOSFET, IGBT, HEMT, of the power converter. In some embodiments, the controller comprises interfaces for communicating with external devices through protocols such as CAN Bus, RS 485, Ethernet, etc.

In some embodiments, a cloud-based platform can be used to control all EV chargers connected to the secondary grid. When loading on one or more transformers is high, EV chargers can reduce or stop charging. However, this may be difficult to implement due to the potentially high data bandwidth requirements and may be susceptible to potential cybersecurity risks.

Figure 16A:
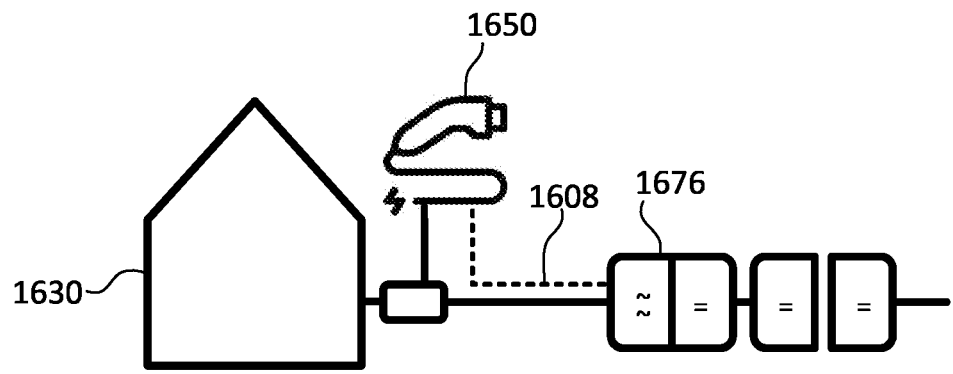
FIGS. 16A and 16B are schematic block diagrams portions of a DC SDS having communication between an inverter and an EV charger.
Figure 16B:
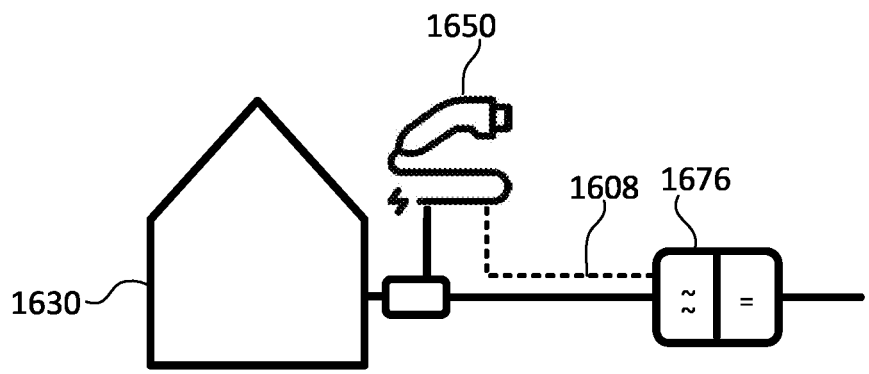

Alternatively, the system described herein enables an approach based on variable DC link voltage. Referring to FIGS. 16A and 16B, in some embodiments, a home side inverter 1676 or DSI is configured to directly communicate with an EV charger 1650 in a home 1630 via a wired or wireless communication connection 1608. The inverter 1676 may receive transformer loading information measured by a transformer-side rectifier or TSC by using voltage and current sensors inside the rectifier. DC link voltage can be used to communicate the transformer loading information from the transformer-side rectifier/TSC to the inverter 1676 and determine whether the EV should be charged. With this approach, cybersecurity issues are substantially reduced as the operation of the EV chargers of the secondary grid is controlled via the hardwire connection between the rectifiers/TSC and inverters 1676 as opposed to a cloud or internet-based platform.

In some embodiments, a rectifier (such as the rectifiers 470, 570, 670, 770, 870, 1370, 1470 or 1570 of FIGS. 4 to 8 and 13 to 15) proximate a transformer can measure power flowing through the transformer by measuring voltage and current. Based on the measured transformer loading, DC link voltage can be regulated as a signal to inverters. In some embodiments, a first conversion unit (including a rectifier) of a DC SDS may monitor loading of a distribution transformer, and the DC link voltage Vdc level generated by the rectifier may be a function of the measured transformer loading. A second conversion unit (including an inverter) of the DC SDS may, in turn, control or manage power usage, such as EV charging functionality (FIGS. 16A and 16B) as a function of the Vdc level.

Figure 17A:
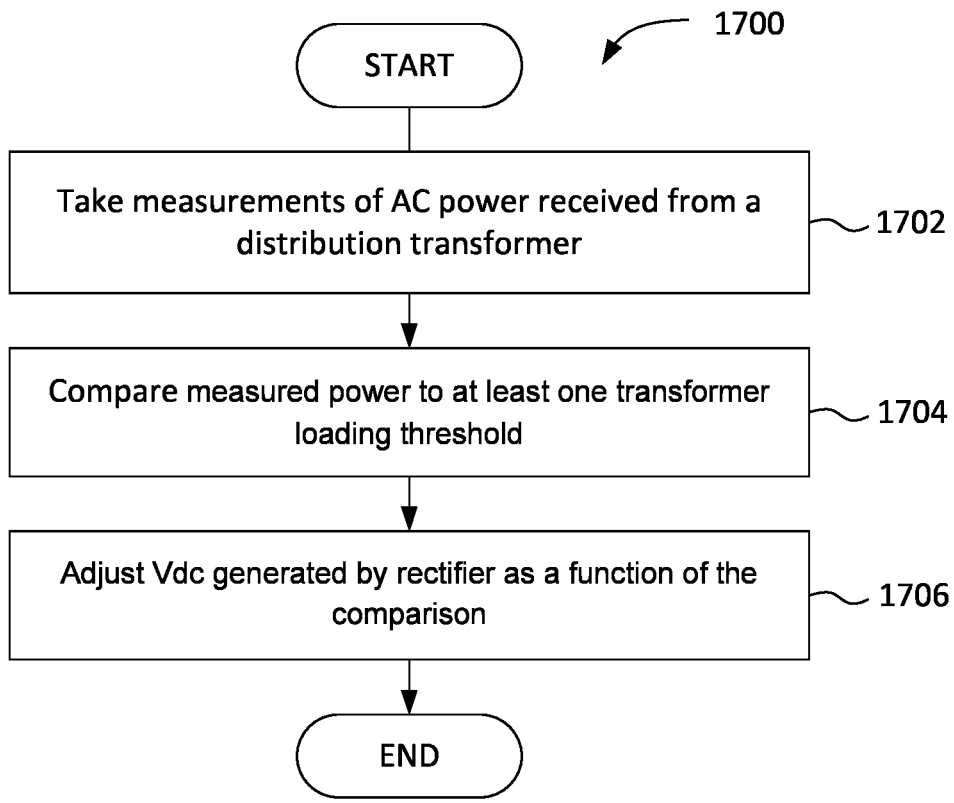
FIG. 17A is a flowchart of a method for controlling DC link voltage (Vdc) by a first conversion unit comprising a rectifier.

FIG. 17A is a flowchart of a method 1700 for controlling DC link voltage (Vdc) by a first conversion unit comprising a rectifier as a function of measured transformer loading according to some embodiments. The first conversion unit may include a rectifier controller that is configured to implement the method 1700.

At block 1702, the first conversion unit (e.g., rectifier controller) takes measurements of AC power received from a distribution transformer. This step may include measuring voltage and current flowing from the distribution transformer using sensors. The power may be indicative of transformer loading. The controller may, for example, include an electronics board that has one or more microprocessors, one or more data converters such as digital-analog converter (DAC) or analog-digital converter (ADC), and may include additional electronics components. The microprocessors may reads the measured data from the sensors and process the data for control purposes. Embodiments are not limited to a particular hardware configuration of the controller.

At block 1704, the measured power is compared to at least one transformer loading threshold. The threshold(s) may include a base loading threshold (PBase), a maximum loading threshold (Pmax) and/or at least one intermediate loading threshold between Pbase and Pmax.

At block 1706, the DC link voltage Vdc generated by the rectifier is adjusted as a function of the comparison of block 1704. For example, Vdc may be increased as a function of the measured transformer loading exceeding at least one threshold.

Figure 18A:
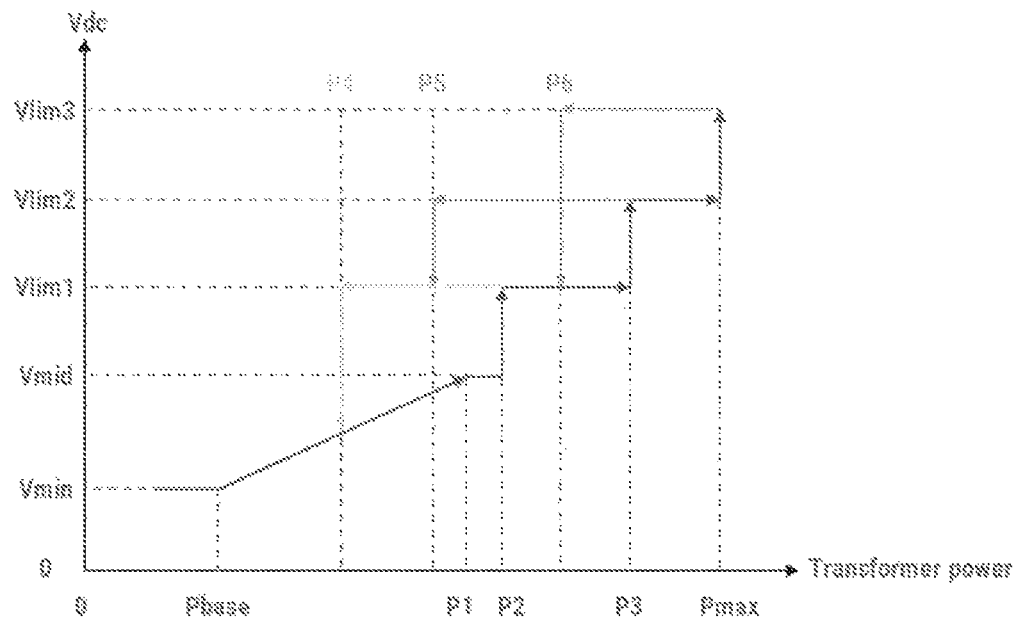
FIG. 18A is a graph showing voltage levels as function of the output of a distribution transformer.

A specific example of how block 1706 may be implemented in some embodiments is described below with reference to FIG. 18A. However, embodiments are not limited to the specific example of FIG. 18A, and other variations may be implemented.

Optionally, blocks 1702 to 1706 may be repeated over time. For example, if the transformer loading changes (increased or decreased), then the DC link voltage Vdc generated by the rectifier is dynamically adjusted to follow transformer loading, based on repeated comparisons to the at least one transformer loading threshold.

Figure 17B:
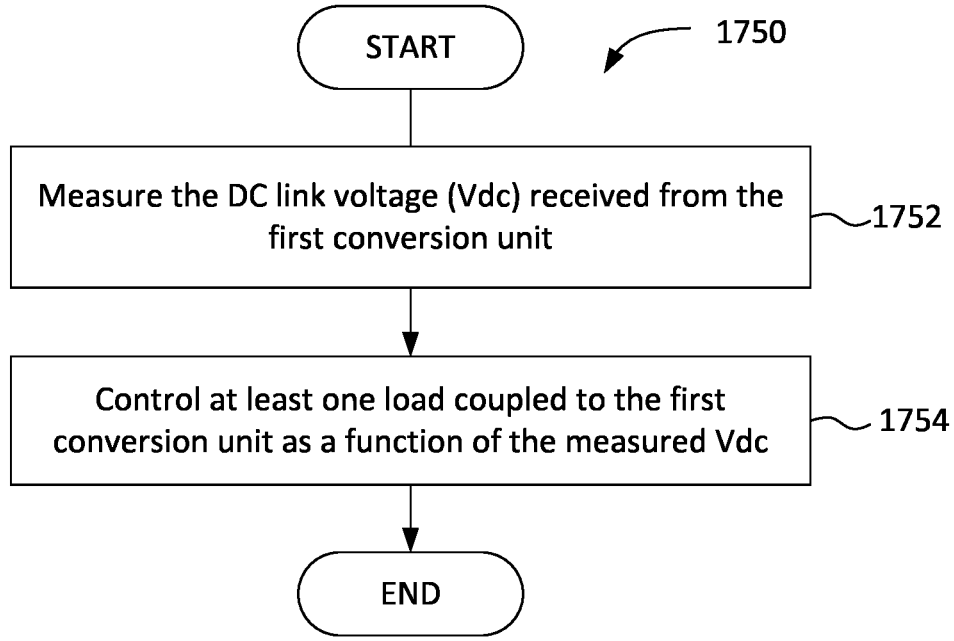
FIG. 17B is a flowchart of a method for managing, by a second conversion unit comprising an inverter, power usage as a function of Vdc supplied by the first conversion unit.

FIG. 17B is a flowchart of a method 1750 for managing, by a second conversion unit comprising an inverter, power usage as a function of Vdc supplied by the first conversion unit according to some embodiments. The second conversion unit may include an inverter controller that is configured to implement the method 1750.

At block 1702, the second conversion unit (e.g., inverter controller) measures the DC link voltage (Vdc) received from the first conversion unit.

At block 1754, at least one load coupled to the first conversion unit (directly or indirectly) is controlled or managed as a function of the measured Vdc. For example, the measured Vdc level may be compared to a plurality of pre-defined ranges or threshold levels, where each range or threshold corresponds to a particular power management parameter. An example of power management in the context of an EV charger coupled to the inverter is described below. However, embodiments are not limited to this example.

Optionally, blocks 1752 and 1754 may be repeated over time. By the methods 1700 and 1750 of FIGS. 17A and 17B, FIG. 18A is a diagram illustrating an example details of a process for controlling DC link voltage (Vdc) by a rectifier as a function of measured transformer loading. The rectifier controller implementing block 1706 of FIG. 17A may perform the steps described below with reference to FIG. 18A.

When transformer loading is below a base threshold Pbase, the DC link voltage Vdc is kept at a lower voltage level, Vmin, by the rectifier controller. Pbase depends on the capacity of a transformer and is configurable but is commonly around 30% of the maximum capacity.

When transformer loading increases beyond Pbase, the rectifier controller causes Vdc to increase according to transformer loading. As shown in FIG. 18A, the level of Vdc may initially increase linearly as the measured power increases past Pbase.

When transformer loading reaches a first intermediate threshold P1, the rectifier controller holds Vdc at a mid-level Vmid. A deadband may be implemented to prevent frequent changes of Vdc and for a more easily discernable indication of the loading state of the transformer. Therefore, may Vdc stays at Vmid when transformer loading is between P1 and a second intermediate threshold P2. For example, P1 can be set at a power level around 60% or 65% of the maximum transformer capacity Pmax and P2 can be set at a power level close to the limit of transformer rating, e.g., 70% or 80% of the maximum transformer capacity.

In an embodiment, reaching P2 means that the EV charging demand cannot further increase. In response, the rectifier controller causes DC link voltage Vdc to jump to a higher voltage level, Vlim1.

In an embodiment, a third intermediate threshold P3 is a limit that is closer to the transformer rated power, e.g., 90% Pmax. In this instance, reaching P3 means that the transformer is reaching its operating limit and demand should be reduced. This can be carried out by reducing charging power demand from EV chargers. When transformer loading is at P3, the rectifier controller causes Vdc to jump up to another higher voltage level, Vlim2.

Pmax is the rated power capacity of a transformer. At this point, transformer overloading begins, and the rectifier controller will cause Vdc to further jump to another higher voltage level, Vlim3.

If demand response is initiated by the grid operator, Vdc can also jump to Vlim3.

As described above, one or more second conversion units (each including a respective inverter and controller) may regulate power usage of one or more loads associated with a home as a function of the measured level of Vdc received from the first conversion unit. A specific example of managed charging for one or more EV charger is summarized below. However, embodiments are not limited to this specific example. The following managed charging parameters may be implemented by the inverter controller:

If Vmin<Vdc<Vmid, the inverter(s) can start EV chargers freely.

If Vdc=Vlim1, the inverter controller(s) requests charger(s) to hold off on charging to prevent further increase of the charging demand. For example, chargers that have already started charging may keep charging at the same power level. Chargers that have not started charging will not start. In this condition, transformer loading may decrease if the base household power demand reduces. When the transformer loading is reduced to a limit P4 (e.g. 50% of Pmax) or lower for a given period (e.g. 15 minutes), the level of Vdc may be reduced to a lower voltage level between Vmin and Vmid and the inverter controller(s) may signal to the chargers that EV charging may resume, meaning that chargers can increase charging power if needed and/or inactive chargers may start if needed.

If Vdc=Vlim2, each inverter controller may request its respective EV charger to reduce charging demand. For example, if the transformer loading can be reduced to P5 (e.g., 60% of Pmax), Vdc may be returned to Vlim1 to cease measures to reduce charging power and to remain at the current power level. New chargers would not be activated. If the transformer loading stays below P5 for a given period (e.g. 15 minutes), Vdc may return to the value that determined by the power-voltage relationship between Pbase and P1, which means that chargers can increase their charging power demand as needed and/or inactive chargers may be activated as required.

If Vdc=Vlim3, the transformer is overloaded or a demand response request has initiated. In this case, the inverter controllers may stop all EV chargers and Vdc may return to Vlim1 to pause all chargers until the transformer loading backs to normal or the demand response request is lifted.

The above is one example of how DC link managed charging may be implemented using embodiments of the present SDS system. In other embodiments, a different number of transformer load thresholds P1,P2, . . . , Pn may be selected having any number of corresponding desired Vdc levels. Likewise, the house-side inverters of the SDS may be configured to respond to Vdc levels and instruct their corresponding EV chargers in various ways besides in the manner described above. For example, certain inverters may be prioritized and instruct their corresponding chargers to initiate or continue charging while others are not permitted to charge.

These operating principles similarly apply for the architectures illustrated in FIGS. 12 and 13, with the exception that DSI proximate the homes will communicate with EV chargers.

These operating principles may also similarly apply for the architectures illustrated in FIGS. 14 and 15 to manage EV charging demand. However, as inverters receive output voltages of individual DC-DC converters, homes can have different DC link voltages, e.g. Vdc2,1 for a first home and Vdc2,i for second home. This further allows optimization of the operation of the DC SDS. For instance, in the TSC, Vdc can follow the same principles illustrated in FIG. 17. However, Vdc2,i can be individually controlled to ask the EV charger of a specific home to start charging while keeping the other chargers paused.

Figure 18B:
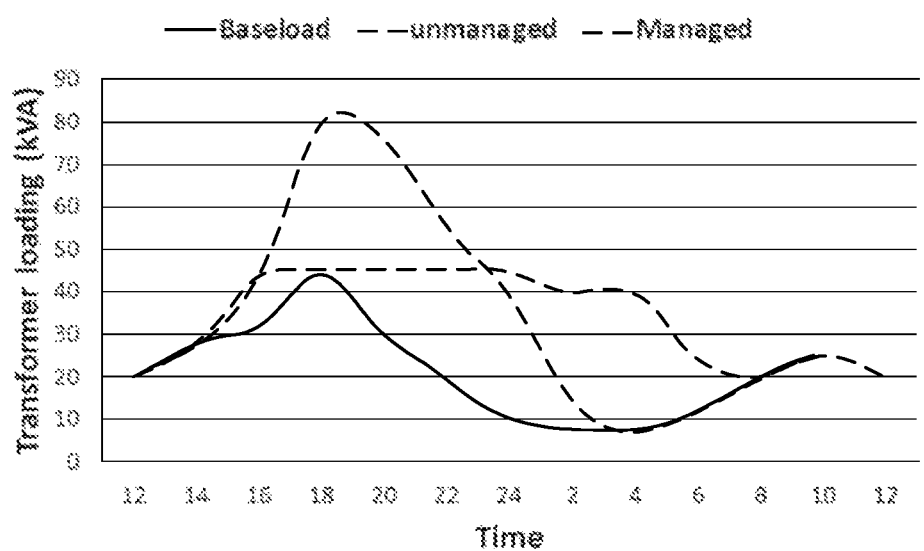
FIG. 18B is a graph showing transformer loading with and without managed charging.

In some embodiments having variable DC link-based DC SDS operation, charging demand can be managed to prevent the transformer overloading. FIG. 18B illustrates the result of managed charging using an example neighborhood with 10 homes receiving power supplied by 0 kVA distribution transformer. Each home has a 10 kW EV charger and we assume that the average energy for charging is 35 kWh per home. Without controlling EV chargers, peak transformer loading reaches over 80 kVA due to the high-power demand for charging. This may overload and damage the transformer and primary feeders. With the present variable DC link-based DC SDS demand management approach, transformer loading may be consistently kept below 0 kVA, meaning that transformer overloading is prevented.

Figure 19A:
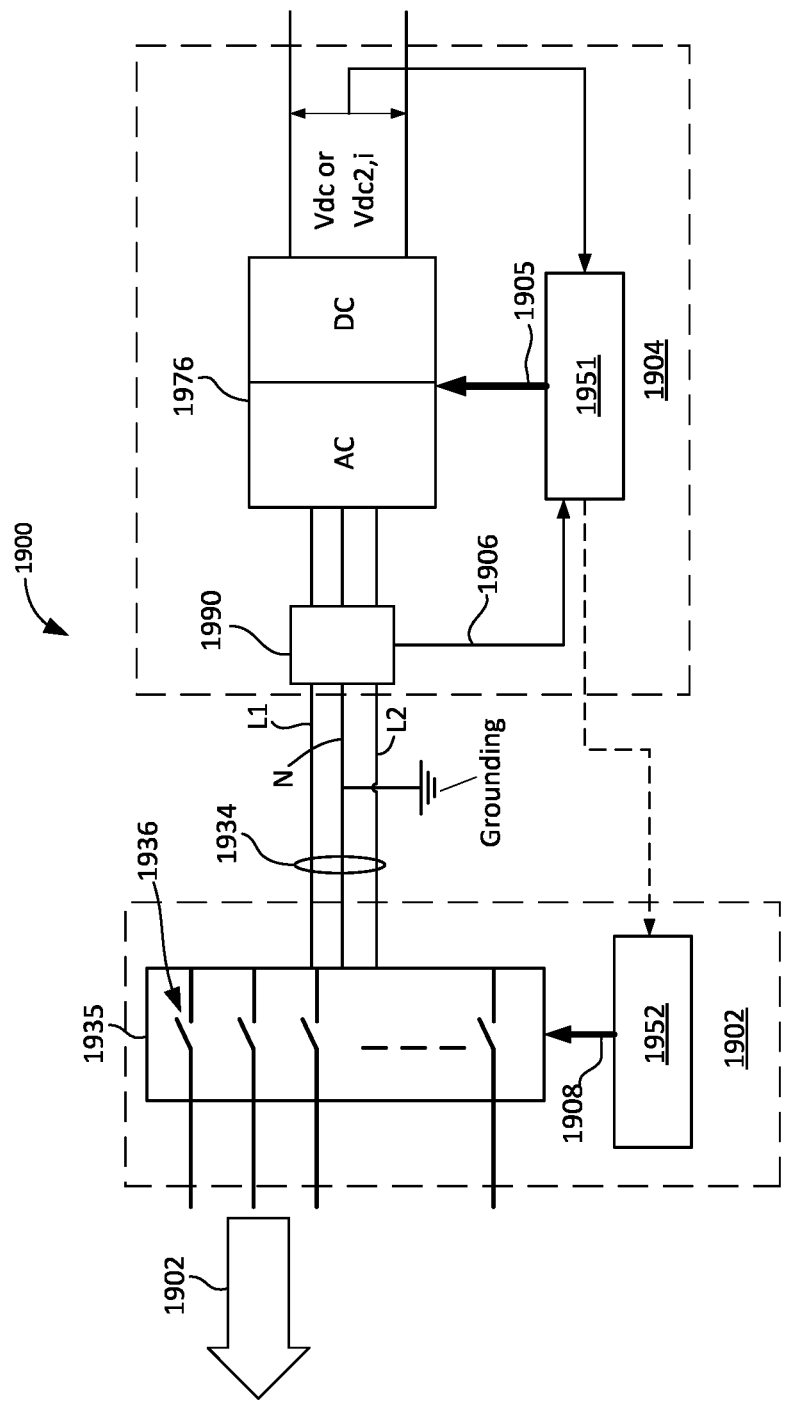
FIG. 19A is a partial, inverter-side schematic block diagram of yet another an example DC SDS system.

FIG. 19A is a partial schematic block diagram of an example DC SDS system 1900. FIG. 19A shows the "inverter" side of the system 1900. including a "smart" home panel 1902, and a conversion unit 1904 coupled to the smart home panel 1902. The smart home panel 1902 includes an electrical panel 1935 and a panel controller 1952. The conversion unit 1904 includes an inverter 1976, a filter/sensor block 1990, and an inverter controller 1951. The system 1900 further includes a meter 1934 on AC conductor lines L1, L2 and neutral line N that interconnect the conversion unit 1904 and the smart home panel 1902.

The inverter controller 1951 controls the inverter 1976 via control signals 1905. The control signals 1905 may control AC power output characteristics and power conversion functions of the inverter 1976. The control signals 1905 may include PWM signals for controlling the voltage and/or current of the inverter 1976. In some embodiments, the inverter controller 1951 controls the current/voltage output of the inverter 1976. In some embodiments, the inverter controller 1951 can generate the control signals 1905 to turn on and off power semiconductors (e.g., MOSFET, IGBT, HEMT) of the inverter 1976. In some embodiments, the inverter controller 1951 comprises interfaces (not shown) for communicating with external devices through protocols such as CAN Bus, RS 485, Ethernet, etc.

The filter/sensor block 1990 is coupled to the AC conductor lines L1, L2 and neutral line N and is configured to take measurements of voltage and/or current output of the inverter 1976. These measurements are output (1906) to the inverter controller 1951. The inverter controller 1951 in this example also communicates with the panel controller 1952. The filter/sensor block 1990 may also filter current output from the inverter 1976. For example, harmonics and/or ripples may be filtered from the current output. In other embodiments, the filter and sensor components of the filter/sensor block 1990 may be separated and/or the filter component may be omitted.

The electrical panel 1935 may comprise multiple circuit breakers 1936 that individually and selectively connect electrical outlets, lighting and home appliances or other loads (indicated by arrow 1901) to electrical power. The panel controller 1952 outputs control signals 1908 to the home panel 1935 as a function of information or control signals received from the inverter controller 1951.

The system 1900 may facilitate extension of demand side management from managed charging to include power management of homes. In this example, the conversion unit 1904 receives transformer loading information. Variable DC link voltage Vdc or Vdc2,i shown in FIG. 19A is input to the inverter controller, and this DC voltage Vdc or Vdc2,i may be indicative of the distribution transformer loading information. The inverter controller 1951 may determine a power demand limit as a function of the DC link voltage Vdc or Vdc2,i and may send the determined power demand limit using a controller 1951 to panel control 1952 of the smart home panel 1902. The panel controller 1952 may then connect or disconnect high power loads via the circuit breakers 1936 of the electrical panel 1935. The high-power loads could include, but are not limited to home appliances (e.g., dishwasher, washing machine, EV charger, etc.). These loads may be connected or disconnected to regulate the home power demand. In this way, the home power demand may be maintained at a lower level.

Figure 19B:
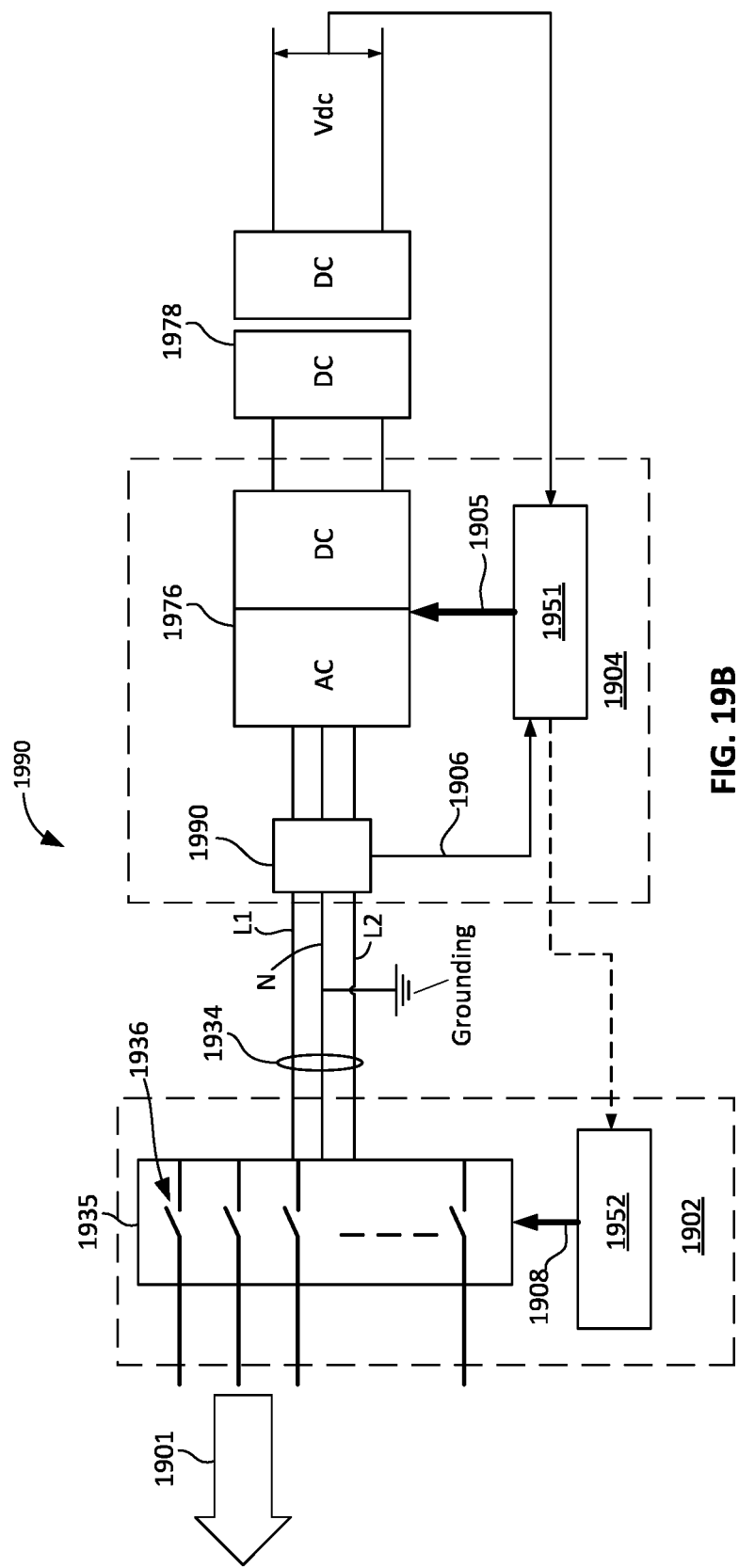
FIG. 19B is another partial, inverter-side schematic block diagram of an example DC SDS system, including an isolating DC-DC converter.

FIG. 19B shows a system 1990 similar to the system 1900 of FIG. 19A, but modified with an isolated DC-DC converter 1978 on the DC side of the inverter 1976.

The controllers 1951 and 1952 and sensor/filter block 1990 may optionally be external to the respective smart panel 1902 or conversion unit 1904. In other embodiments, the two controllers 1951 and 1952 may be integrated in a single controller device. Embodiments may also include other variations from the specific examples of FIGS. 19A and 19B.

Figure 20A:
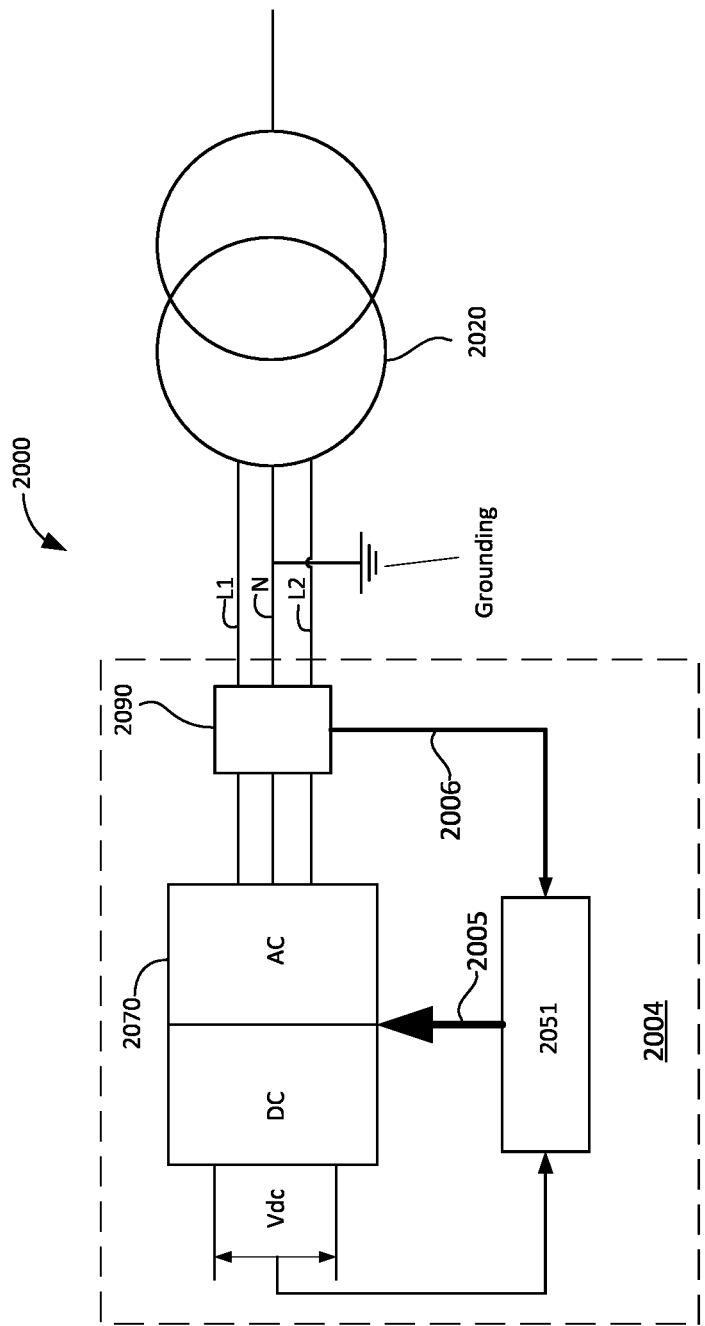
FIGS. 20A and 20B are partial, rectifier-side schematic block diagrams of yet another an example DC SDS system.

FIG. 20A is a partial schematic block diagram of a DC SDS system 2000. FIG. 20A shows the "rectifier side" of the system 2000. The system 2000 includes a distribution transformer 2020, and a conversion unit 2002 that received AC voltage from the distribution transformer 2020. The conversion unit 2004 includes a rectifier 2070 that converts AC voltage from the distribution transformer 2020 to DC voltage, a rectifier controller 2051, and filter/sensor block 2090.

The rectifier controller 2051 controls the in rectifier 2070 via control signals 2005. The control signals 2005 may control DC voltage output characteristics and power conversion functions of the rectifier 2070. The control signals 2005 may include PWM signals. In some embodiments, the rectifier controller 2051 controls the rectifier 2070 in a closed loop control manner. In some embodiments, the rectifier controller 2051 can generate the PWM control signals 2005 to turn on and off power semiconductors (e.g., MOSFET, IGBT, HEMT) of the rectifier 2070 to control the DC voltage output of the rectifier 2070.

The filter/sensor block 2090 is coupled to the AC conductor lines L1, L2 and neutral line N and is configured to take measurements of voltage and/or current output of the distribution transformer 2020. These measurements 2006 are output to the rectifier controller 2051. The filter/sensor in other embodiments, the filter and sensor components of the filter/sensor block 2090 may be separated and/or the filter component may be omitted.

In addition to AC-side measurements 2006 from the filter/sensor block 2090, the rectifier controller 2051 may receive the DC voltage output from the rectifier 2070 to measure or determine DC voltage, current, and/or power information. The controller may monitor the DC output from the rectifier 2070 and may generate control signals based thereon to control demand side management.

The measurements from the 2006 filter/sensor block 2090 can be used to monitor the status of the transformer 2020 by the controller 2051. This information can provide a grid operator with the estimated remaining lifetime of transformers 2020 and/or also send warning signals to the grid operator before the failure of the transformer 2020.

Figure 20B:
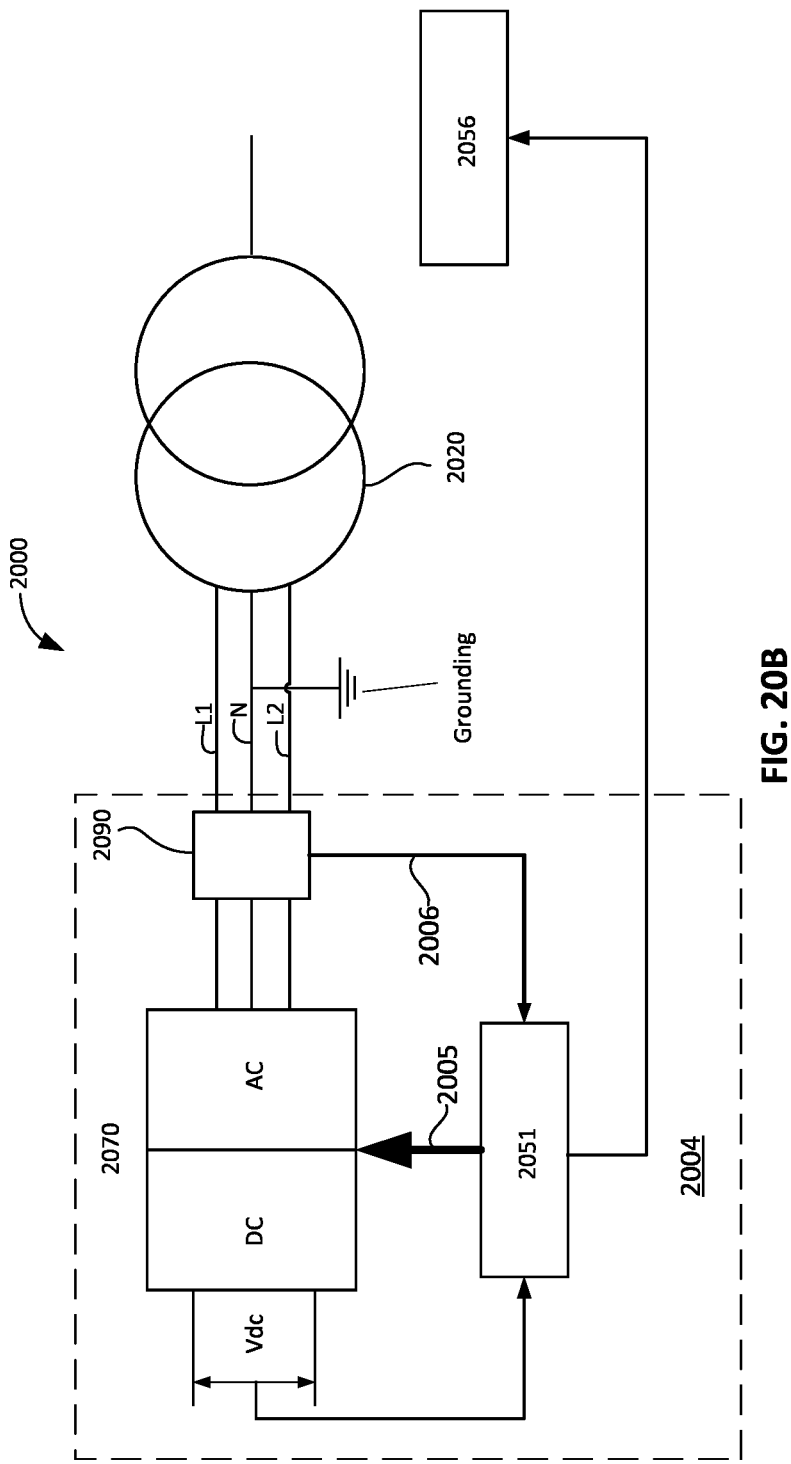

FIG. 20B shows the system 2000 of FIG. 20A, but with the rectifier controller 2051 further connected to an internet server 2056 or platform (e.g., cloud server or platform). Measurement data may be sent to the server 2056 or other platform for remote processing of the data. The remote processing may provide information about transformer status, remaining lifetime and/or other information, for example.

Figure 21:
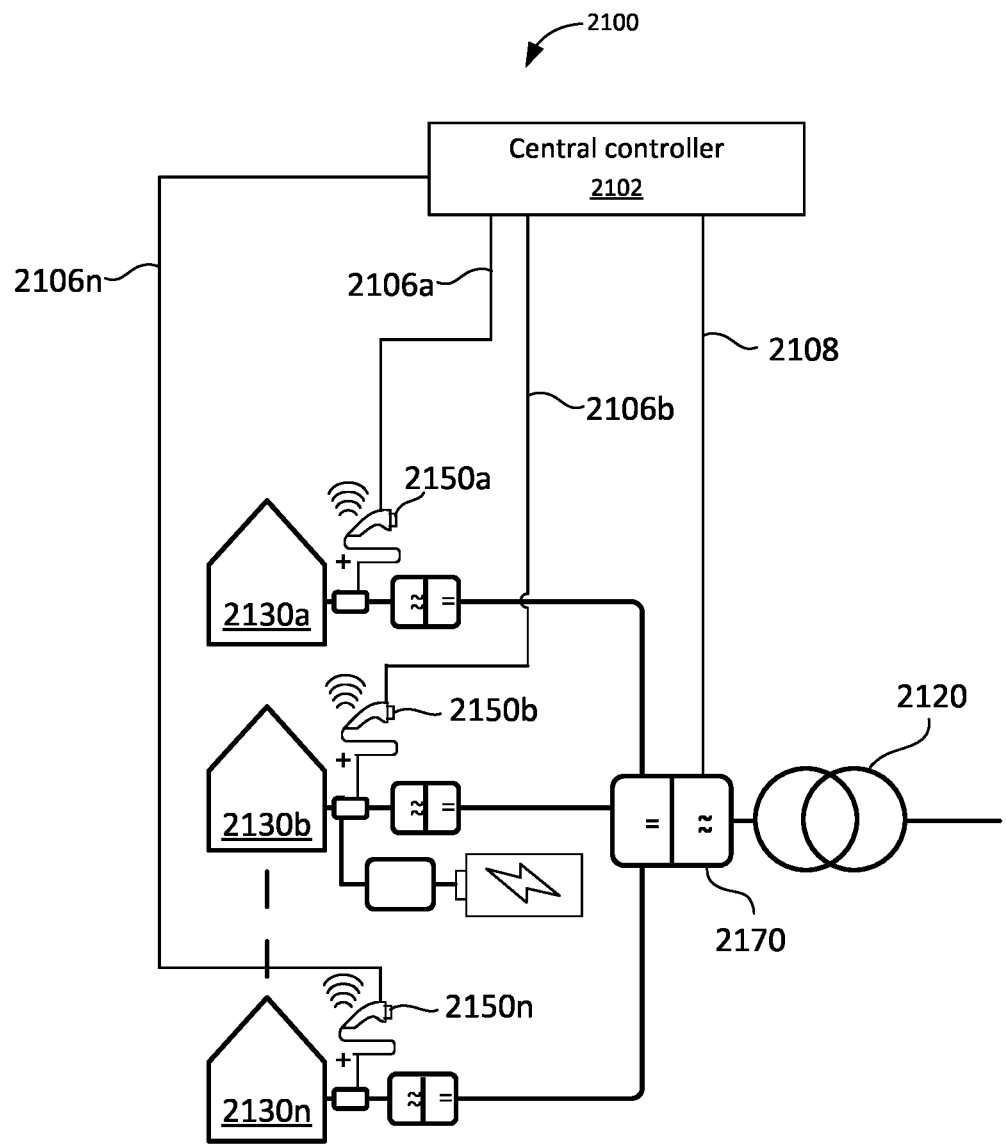
FIG. 21 is a schematic block diagram of another example DC SDS system distributing power to a neighborhood of homes.

In some embodiments, localized EV charging demand management program can be implemented with networked EV chargers and a central controller connected to a rectifier configured to measure transformer loading. FIG. 21 is a schematic block diagram of another example DC SDS system 2100 distributing power to a neighborhood of homes (2130a, 2130b to 2130n) according to some embodiments. This example illustrates an example implementation of charging demand management using the basic DC SDS structure as an example. In other embodiments, charging demand management can also be implemented with DC SDS systems with DSI or TSC, or a partial SDS system as illustrated by 502 of FIG. 5. In the example of FIG. 21, each home (2130a, 2130b to 2130n) is shown with a respective EV charger (2150a m 2150b to 2150n). The EV chargers have network capability and are connected to the central controller 2102 via suitable communication protocols. Example suitable protocols include, for example, Open Charge Point Protocol (OCPP). The central controller 2102 is configured to read data from the conversion unit 2170 (including a rectifier) via communication line 2108. The data may include or be indicative of transformer loading information. The central controller 2102 may also receive data from the EV chargers 2150a and 2150b to 2150n via communication lines 2106a and 2106b to 2106n. The central controller 2102 also send control commands via communication lines 2106a and 2106b to 2106n to the chargers using the communication protocol as a function of the data from the conversion unity and/or EV chargers 2150a and 2150b to 2150n.

The power converter at the transformer side, i.e., rectifier or TSC, measures real-time power loading of the transformer and sends the measured value to a central controller, which can be a cloud-based or a local server-based software platform deployed in the operation center of the utility company. Based on the transformer loading value, the central controller can send appropriate commands to the EV chargers that are connected to the transformer. For example, if the transformer rated capacity is 0 kVA and the current loading is 40 kVA, the central controller can send a power reduction command to the EV chargers that are using high power. Conversely, if the current loading is 10 kVA, the central controller can permit the EV chargers to freely draw power.

The DC SDS disclosed herein may allow easy integration of residential PV system, RES, and residential DC EV chargers on the DC side of the inverter or DSI at or proximate a home. Such arrangements may also provide higher efficiency of energy usage.

Figure 22A:
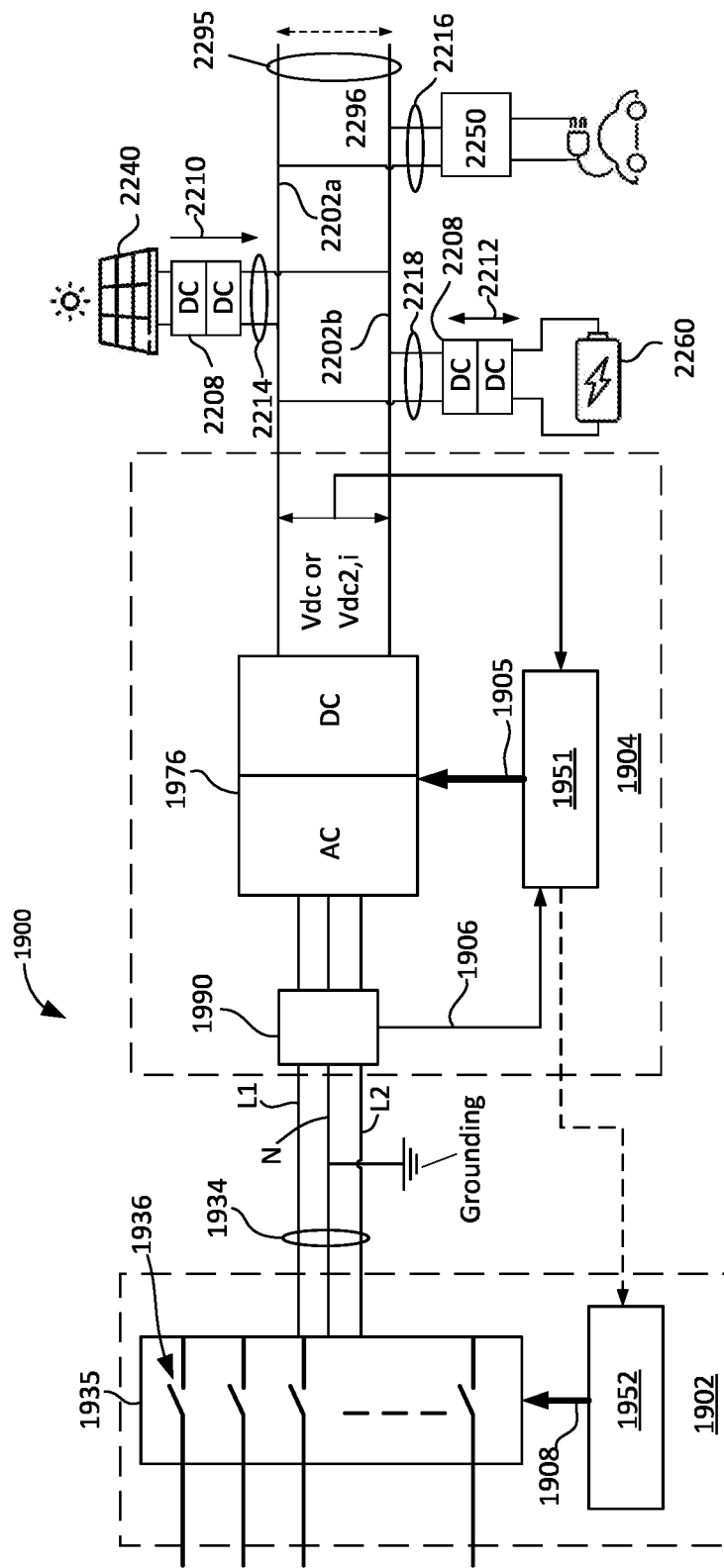
FIGS. 22A and 22B are schematic block diagram of the system of FIG. 19, also including one or more electric vehicles (EVs)

FIG. 22A is another schematic block diagram of the system 1900 of FIG. 19A, but additionally showing optional PV system 2240, RES 2260, and DC EV charger 2250 are connected to DC power lines 2202a and 220b on the DC side of the inverter 1976 of the conversion unit 1904. More than one of each of the PV system 2240, RES 2260, and DC EV charger 2250 may be connected to the DC side in other embodiments. Electric vehicle 2004 is also shown charging at the DC EV charger 2250. Isolated DC-DC converters 2208 may optionally be connected intermediate one or more of the PV system 2240, RES 2260, and DC EV charger 2250 and the DC power lines 2202a and 220b.

DC power flow from the PV system 2240 to the inverter 1976 may be unidirectional, as indicated by arrow 2210. DC power flow between the RES 2260 and the inverter 1976 may be bidirectional, as indicated by arrow 2212. DC EV charger 2250 may be configured for either unidirectional or bidirectional DC power flow. With a bidirectional DC EV charger 2250, energy inside batteries of the EV may be used to power a home or to provide auxiliary services to the power grid.

A DC meter 2295 may be added at a DC input side of an inverter 1976 or DSI to measure the net energy supplied from the power grid, and AC meter 1934 may be omitted in some embodiments. Additional meters 2214, 2216, and/or 2218 may be added for PV system 2240, RES 2260, and/or DC EV charger 2250 respectively. Such additional meters may, for example, be required by distribution grid operators.

Figure 22B:
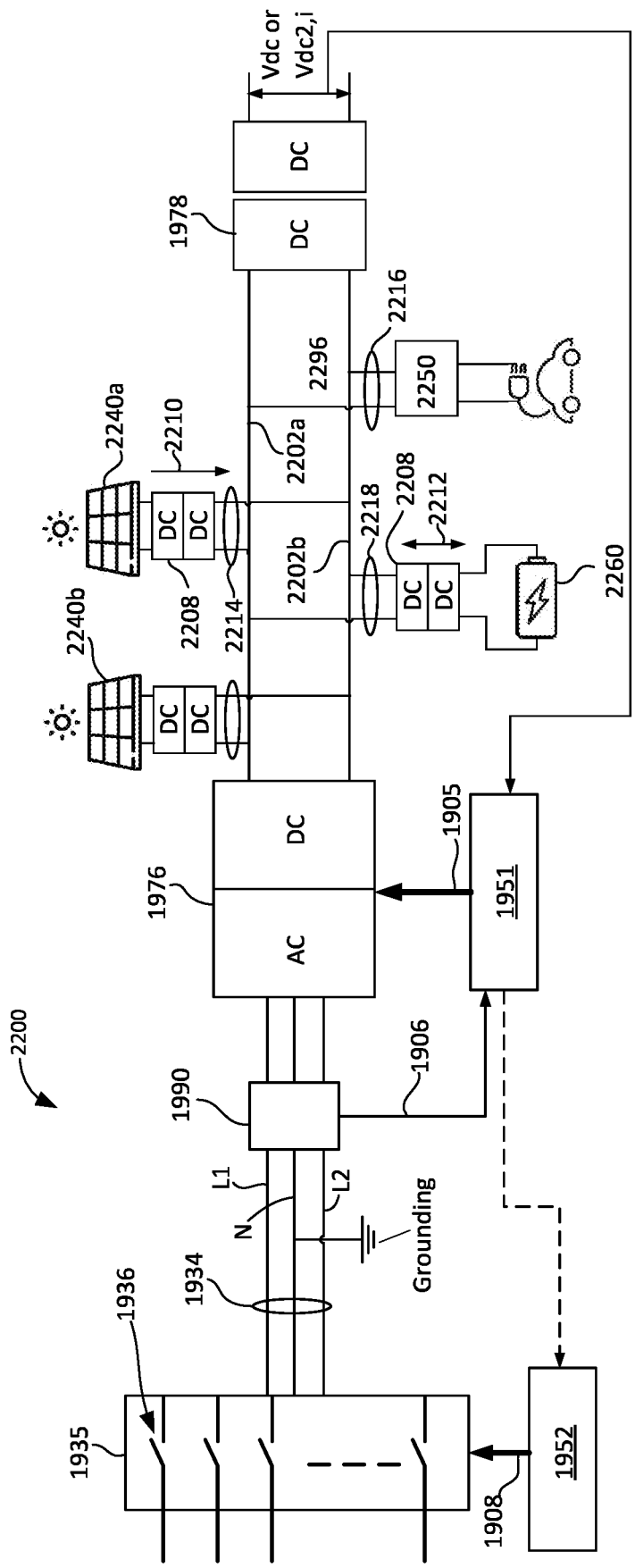

FIG. 22B shows a system 2200 similar to the system 1950 of FIG. 22B, including the isolated DC-DC converter 1978 on the DC side of the inverter 1976. In this example, PV systems 2240a and 2240b, RES 2260, and DC EV charger 2250 are connected to a DC link of the inverter 1976 (via lines 2202a and 2202b). The DC link is an internal DC link of a DSI between the inverter 1976 and the isolated DC-DC converter 1978. DC-DC converter 1978 typically also includes a controller. The controller of the DC-DC converter and inverter controller may be integrated as a single controller in some embodiments. Similarly, if the DC-DC converter is instead proximate the rectifier, then the rectifier and DC-DC converter may share a controller.

First, in some embodiments, parallel PV system strings, where each string is formed by a plurality of PV panels 2240 connected in series, can be directly connected to the DC side of the inverter 2276. Second, in some embodiments, interfacing DC-DC converters 2208 such as PV optimizers can be adopted to connect PV panels 2240 to the DC side of the inverter 1976.

Figure 23:
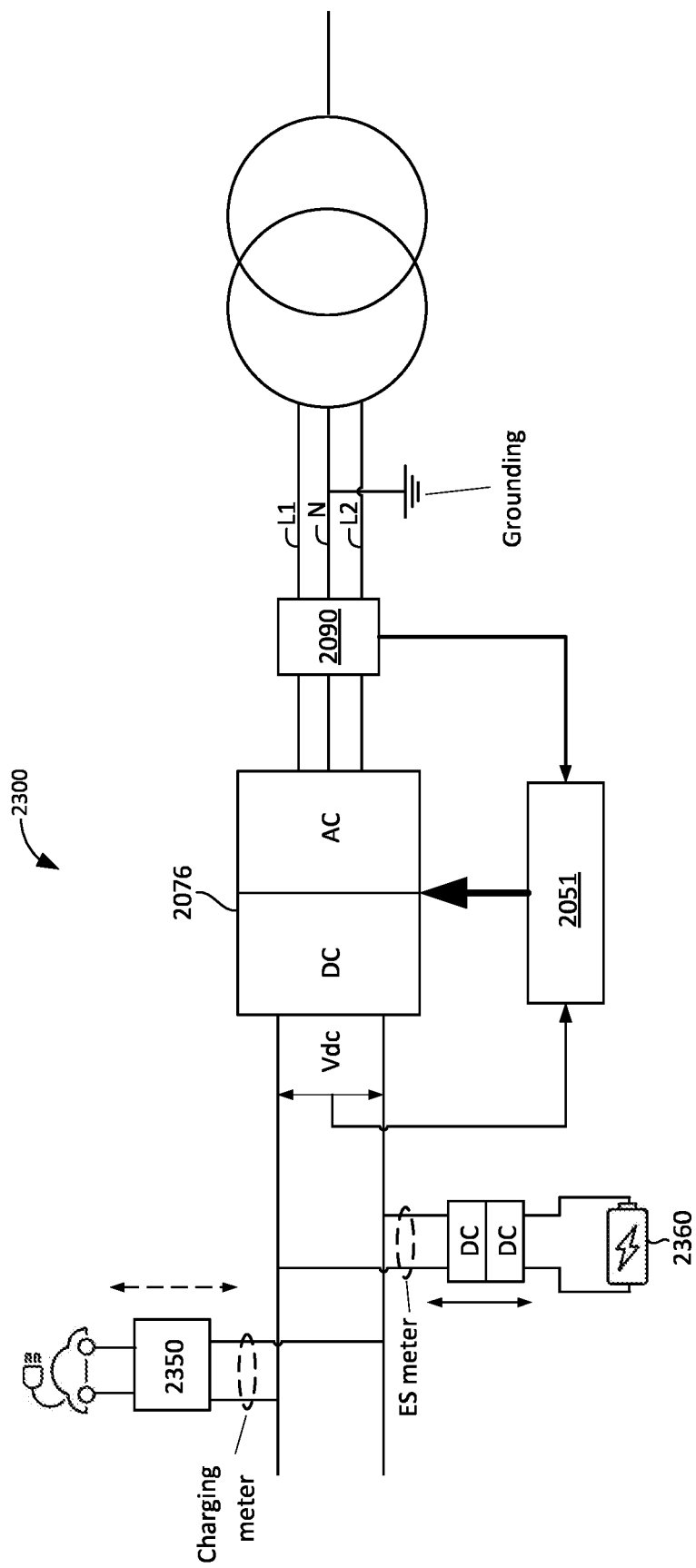
FIG. 23 is a partial, inverter-side schematic block diagram of yet another an example DC SDS system including neighborhood scale energy storage and a DC EV charger.

Referring to FIG. 23, neighborhood scale energy storage 2360 and/or DC EV chargers 2350 may also be integrated at the transformer side of the DC SDS. For all types of architectures, RES 2360 and DC EV chargers 2350 can be integrated at the DC side of the rectifier 2376.

On a larger scale, multiple DC SDS can be coordinated by a central controller. In some embodiments, rectifiers or TSCs can be connected to a central controller platform via either wired or wireless communication channels. The rectifiers and/or TSCs can transmit operating statuses of corresponding DC SDS to a central controller. The central controller conducts an analysis on aspects such as power flow, power quality, demand balance, etc., and sends control commands to distributed rectifiers and/or TSCs.

Figure 24:
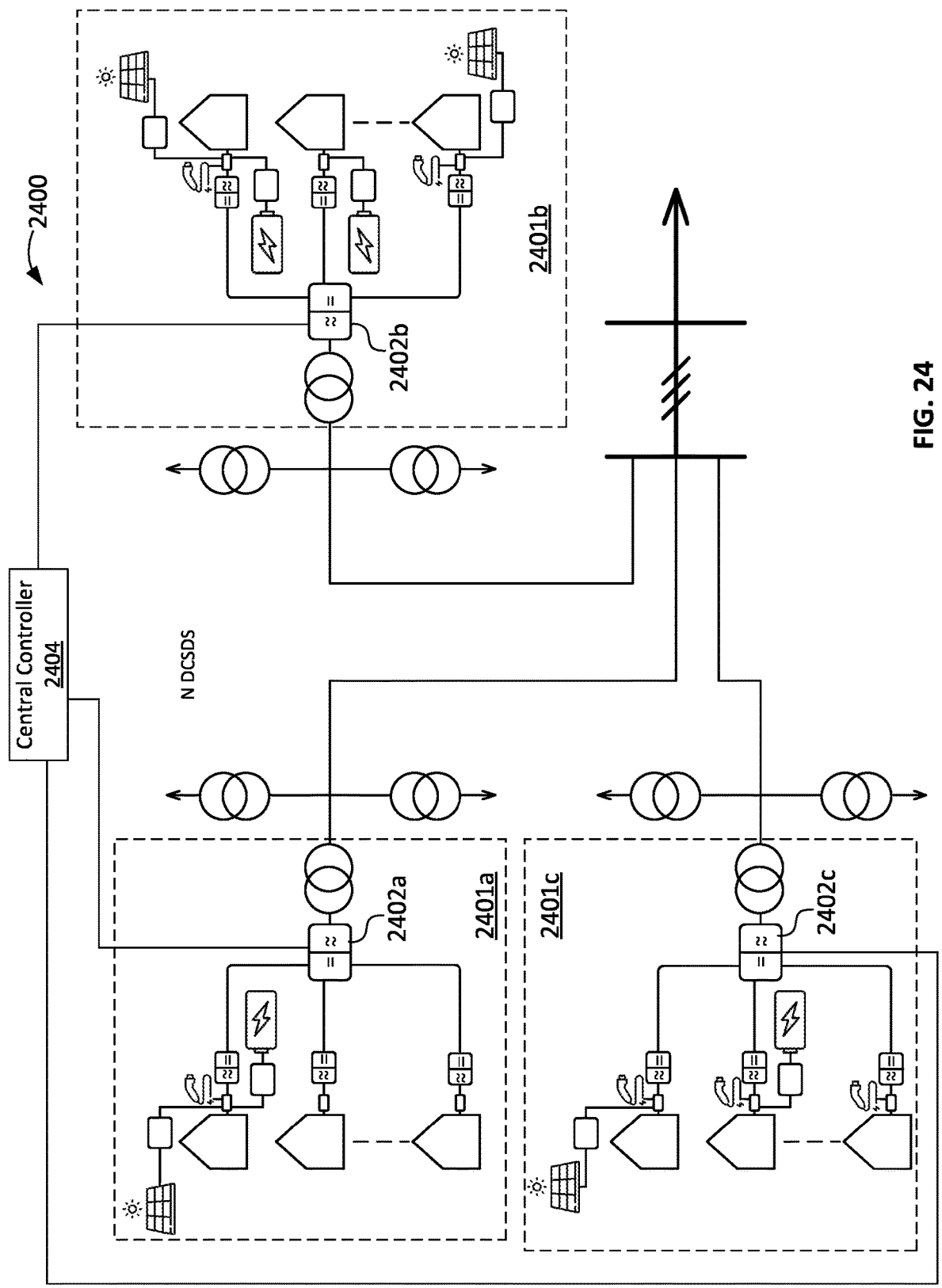
FIG. 24 is a schematic diagram of an example DC SDS system including a central controller.

FIG. 24 is a schematic diagram of an example DC SDS system similar to the example of FIG. 4, but with an additional central controller 2404. The central controller communicates with each of the first conversion units 2402a to 2402c. The first conversion units, like other embodiments described herein, may each include a respective rectifier and rectifier controller. In FIG. 24, the rectifier controllers are connected to the central controller 2402, which thereby control the DC SDS 2400. On a system scale perspective, controlling the DC SDS can also benefit the traditional AC neighborhoods as the power quality may be improved as a result of the management and/or regulation of power distribution to the houses and/or neighborhoods on the DC SDS system.

Figure 25:
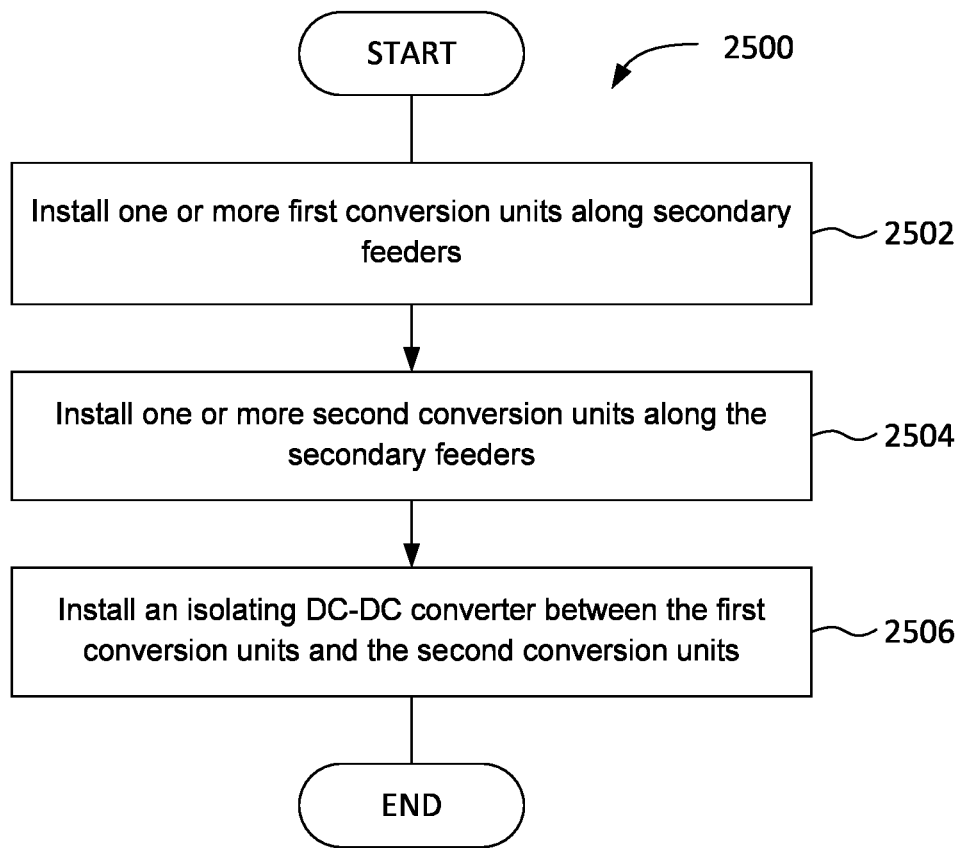
FIG. 25 is a flowchart of an example method of retrofitting an existing AC secondary power distribution grid according to some embodiments.

FIG. 25 is a flowchart of an example method 2500 of retrofitting an existing AC secondary power distribution grid, according to some embodiments. At block 2502, one or more first conversion units are installed along the secondary feeders, the first conversion units configured to receive AC voltage from the distribution transformer and output DC voltage. At block 2504, one or more second conversion units are installed along the secondary feeders. Each second conversion unit is coupled to a secondary feeder connected to a corresponding one of the first conversion units and is configured to received DC voltage from the corresponding conversion unit and to output AC voltage. Each first conversion unit may be coupled (via secondary feeders) to a respective two or more of the second conversion units. Optionally, the one or more second conversion units include one or more inverter controllers configured to synchronize the phase of AC voltages and/or pulse width modulation carrier signals of the second conversion units. As another option, the inverter controllers may be external to the second conversion units and may be installed in a separate step. At block 2506, optionally, an isolating DC-DC converter is installed between each of the first conversion units and their corresponding second conversion unit. In some embodiments, optionally, the first conversion units may include sensors for monitoring loading of a distribution transformer. As another option, such sensors may be installed (external to the first conversion unit) in a separate step. The steps of blocks 2502, 2504 and 2506 are not limited to the order illustrated in FIG. 25. For example, the step of block 2504 may be performed before the step of block 2502. The particular method 2500 is shown for illustrative purposes and does not limit the order in which components of the system are installed for a retrofit.

Figure 26:
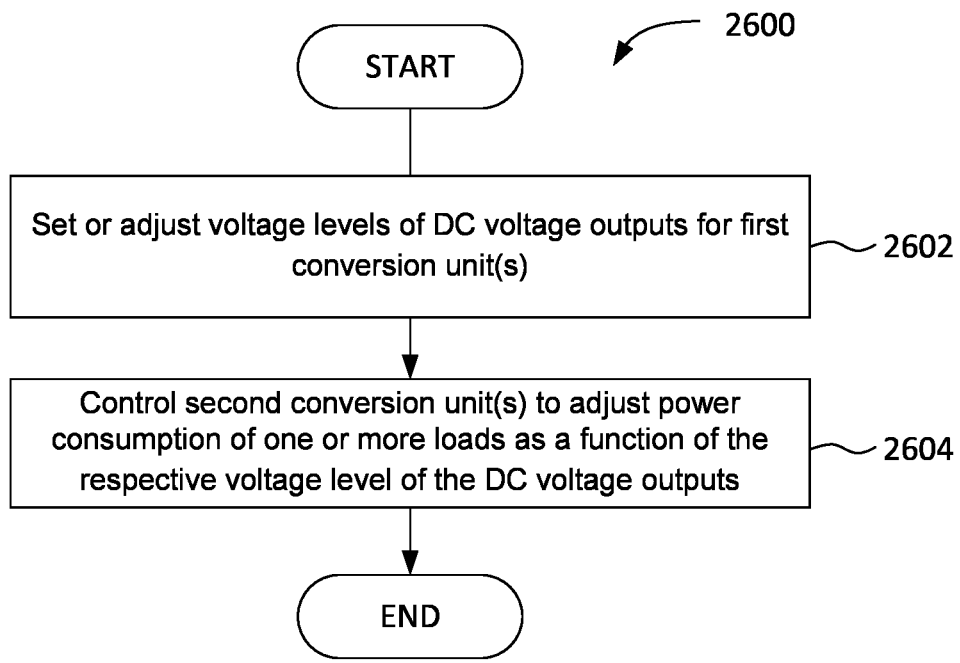
FIG. 26 is a flowchart of a method of operation of an DC SDS, according to some embodiments.

FIG. 26 is a flowchart of a method of operation of a DC SDS, such as one installed by the method 2500 of FIG. 25. In FIG. 26, at block 2602, a voltage level(s) of DC link voltage outputs is set or adjusted for each of one or more first conversion units. This may be accomplished with the method 1700 of FIG. 17A, for example. At block 2604, each of one or more second conversion units are configured to adjust power consumption of one or more loads connected thereto as a function of a corresponding voltage level of the DC link voltage. This may be accomplished with the method 1750 of FIG. 17B, for example.

Elements and features of the various embodiments described herein and shown in the figures may be combined with features and elements of other embodiments described herein and shown in other figures.

Although a few embodiments have been shown and described, it will be appreciated by those skilled in the art that various changes and modifications can be made to those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof.

We claim:

1. A direct current (DC) power secondary distribution system comprising:
   a first conversion unit that receives alternating current (AC) electrical voltage from a distribution transformer of an AC power distribution system and converts the AC electrical voltage to DC electrical voltage output;
   one or more second conversion units connected downstream of the first conversion unit, wherein each second conversion unit converts the DC electrical voltage output from the first conversion unit to a respective AC electrical voltage output for a respective one or more loads;
   a first controller that controls conversion of the AC electrical voltage by the first conversion unit; and
   one or more second controllers that control conversion of the DC electrical voltage output by the one or more second conversion units, wherein
   the first conversion unit comprises at least one sensor configured to take voltage and/or current measurements of the AC voltage from the distribution transformer; and
   the DC electrical voltage output comprises a variable DC voltage output, and the first controller controls a voltage level of the variable DC voltage output as a function of the measurements.

2. The system of claim 1, wherein:
   the first conversion unit comprises a rectifier that converts the AC electrical voltage to the DC electrical voltage output; and
   each of the one or more second conversion units comprises a respective inverter that converts the DC electrical voltage output from the first conversion unit to the respective AC electrical voltage.

3. The system of claim 1, wherein the first conversion unit includes the first controller.

4. The system of claim 1, wherein controlling the voltage level of the variable DC voltage output comprises selecting between at least two discrete voltage levels.

5. The system of claim 1, wherein each of the one or more second conversion units comprises a respective one of the second controllers.

6. The system of claim 1, wherein the one or more second controllers each generate control signals for controlling at least one load of the one or more loads as a function of the variable DC voltage output from the first conversion unit.

7. The system of claim 6, wherein the control signals for controlling the at least one load are for controlling power consumption by the at least one load.

8. The system of claim 1, wherein the control signals for controlling the at least one load are output to a home panel connected to at least one of the one or more second conversion units.

9. The system of claim 6, wherein the at least one load comprises an electric vehicle (EV) charger.

10. The system of claim 8, wherein the at least one load is connected to a DC link of the first conversion unit.

11. The system of claim 1, wherein the one or more second controllers synchronize phase of AC voltage outputs of the one or more second conversion units.

12. The system of claim 1, wherein the one or more second controllers output pulse width modulation (PWM) signals for controlling the one or more second conversion units, and the one or more second controllers synchronize phase of the PWM signals.

13. The system of claim 1, wherein the first controller and the one or more second controllers are connected to a central controller.

14. The system of claim 1, wherein one or more second conversion units are configured for connection to at least one of: a renewable energy source; and an energy storage unit.

15. The system of claim 1, further comprising one or more DC-DC converters, each DC-DC converter connected intermediate a respective one of the first conversion units and one of the second conversion units.

16. The system of claim 2, wherein at least one of the second conversion units comprises a DC-DC converter connected to a DC side of the inverter.

17. A method comprising:
converting, by a first conversion unit, alternating current (AC) electrical voltage from a distribution transformer of an AC power distribution system to direct current (DC) electrical voltage output;
converting, by two or more second conversion units downstream of the first conversion unit, the DC electrical voltage output from the first conversion unit to one or more AC electrical voltage outputs for a respective one or more loads, wherein the DC electrical voltage output is a variable DC voltage output;
taking measurements of current and/or voltage of the electrical voltage from a distribution transformer;
controlling a voltage level of the variable DC voltage output as a function of the measurements;
controlling power consumption of the one or more loads as a function of the variable DC voltage output; and
synchronizing at least one of:
phases of the AC voltage outputs of the two or more second conversion units; or
phases of pulse width modulation (PWM) signals that control the conversion of the DC electrical voltage by the two or more second conversion units.

* * * * *